(12) United States Patent
Song et al.

(10) Patent No.: US 11,244,028 B2
(45) Date of Patent: Feb. 8, 2022

(54) NEURAL NETWORK PROCESSOR AND CONVOLUTION OPERATION METHOD THEREOF

(71) Applicant: Samsung Electronics Co., Ltd., Suwon-si (KR)

(72) Inventors: Jin-ook Song, Seongnam-si (KR); Jihyuck Jo, Daejeon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 197 days.

(21) Appl. No.: 16/524,717

(22) Filed: Jul. 29, 2019

(65) Prior Publication Data

US 2020/0133989 A1  Apr. 30, 2020

(30) Foreign Application Priority Data

Oct. 31, 2018  (KR) .......................... 10-2018-0132559

(51) Int. Cl.
*G06F 17/15* (2006.01)
*G06F 5/01* (2006.01)
*G06N 3/04* (2006.01)

(52) U.S. Cl.
CPC .............. *G06F 17/15* (2013.01); *G06F 5/01* (2013.01); *G06N 3/04* (2013.01)

(58) Field of Classification Search
CPC ........ G06F 17/10; G06F 17/15; G06F 17/153; G06F 17/16; G06F 7/5443; G06F 5/01; G06F 5/012; G06N 3/04; G06N 3/06; G06N 3/063; H03M 13/6577; H03M 13/6594
See application file for complete search history.

(56) References Cited

U.S. PATENT DOCUMENTS

| 9,563,825 | B2 | 2/2017 | Shen et al. |
| 9,697,463 | B2 | 7/2017 | Ross et al. |
| 2016/0342889 | A1 | 11/2016 | Thorson et al. |

(Continued)

FOREIGN PATENT DOCUMENTS

| JP | 2006-235389 A | 9/2006 |
| JP | 2009-210975 A | 9/2009 |
| KR | 10-1827779 | 2/2018 |

OTHER PUBLICATIONS

Patterson et al., "Computer Organization and Design: The Hardware/Software Interface", Fifth Edition, Chapter 1 pp. 4-59, 2014. Retrieved from <https://ict.iitk.ac.in/wp-content/uploads/CS422-Computer-Architecture-ComputerOrganizationAndDesign5thEdition2014.pdf> (Year: 2014).*

(Continued)

*Primary Examiner* — Jaweed A Abbaszadeh
*Assistant Examiner* — Carlo Waje
(74) *Attorney, Agent, or Firm* — Harness, Dickey & Pierce, P.L.C.

(57) ABSTRACT

A neural network processor for performing a neural network operation may include a memory storing computer-readable instructions, and kernel intermediate data, the kernel intermediate data including a plurality of kernel intermediate values calculated based on a plurality of weight values included in kernel data; and at least one processor to execute the computer-readable instructions to perform a convolution operation by selecting at least one kernel intermediate value among the plurality of kernel intermediate values based on an input feature map.

20 Claims, 19 Drawing Sheets

Kernel Intermediate Data Memory

Kernel Intermediate Data (KID)

| Kernel Intermediate Value | Value |
|---|---|
| KIV_1 | 0 |
| KIV_2 | w_1 |
| KIV_3 | w_2 |
| KIV_4 | w_2+w_1 |
| KIV_5 | w_3 |
| KIV_6 | w_3+w_1 |
| KIV_7 | w_3+w_2 |
| KIV_8 | w_3+w_2+w_1 |

(56) References Cited

U.S. PATENT DOCUMENTS

| | | |
|---|---|---|
| 2016/0342892 A1 | 11/2016 | Ross |
| 2016/0358068 A1 | 12/2016 | Brothers et al. |
| 2018/0046898 A1 | 2/2018 | Lo |
| 2018/0046907 A1 | 2/2018 | Ross et al. |
| 2018/0121196 A1 | 5/2018 | Temam et al. |
| 2018/0197068 A1 | 7/2018 | Narayanaswami et al. |
| 2018/0260711 A1* | 9/2018 | Zhang .............. G06N 3/0481 |
| 2019/0026600 A1* | 1/2019 | Bagherinezhad .... G06K 9/6262 |
| 2019/0149134 A1* | 5/2019 | Rhee ............ H03H 17/0238 708/315 |
| 2019/0163716 A1* | 5/2019 | Li .................. G06N 3/0454 |
| 2019/0163717 A1* | 5/2019 | Li .................. G06N 3/0454 |
| 2019/0311266 A1* | 10/2019 | Liu ................. G06N 3/063 |
| 2019/0370692 A1* | 12/2019 | Cho ................ G06N 3/063 |
| 2020/0160161 A1* | 5/2020 | Yoo ................ G06F 7/50 |
| 2020/0160226 A1* | 5/2020 | Ross ............... G06F 7/76 |
| 2020/0250539 A1* | 8/2020 | Liu ................. G06N 3/0481 |
| 2021/0049463 A1* | 2/2021 | Ruff ................ G06N 3/04 |

OTHER PUBLICATIONS

Gudovskiy et al. on "ShiftCNN: Generalized Low-Precision Architecture for Inference of Convolutional Neural Networks". Retrieved on [Apr. 8, 2021]. Retrieved from the Internet <https://arxiv.org/abs/1706.02393> (Year: 2017).*

Bagherinezhad et al. on "LCNN: Lookup-based Convolutional Neural Network". Retrieved on [Apr. 8, 2021]. Retrieved from the Internet <https://arxiv.org/abs/1611.06473> (Year: 2017).*

Jihyuck Jo, et al., "DSIP: A Scalable Inference Accelerator for Convolutional Neural Networks", IEEE Journal of Solid-state Circuits, vol. 53, No. 2, pp. 605-618, Nov. 10, 2017.

Tianshi Chen, et al., "DianNao: A Small-Footprint High-Throughput Accelerator for Ubiquitous Machine-Learning", ASPLOS '14 Proceedings of the 19th international conference on Architectural support for programming languages and operating systems, pp. 269-284, Mar. 1-5, 2014, Salt Lake City, Utah, USA.

Yunji Chen, et al., "DaDianNao: A Machine-Learning Supercomputer", the 47th Annual IEEE/ACM International Symposium on Microarchitecture, Dec. 13-17, 2014, Cambridge, UK.

Yu-Hsin Chen, et al., "Eyeriss: An Energy-Efficient Reconfigurable Accelerator for Deep Convolutional Neural Networks", IEEE Journal of Solid-State Circuits, pp. 127-138, vol. 52, No. 1, Nov. 8, 2016.

Shaoli Liu, et al., "Cambricon: An Instruction Set Architecture for Neural Networks", 2016 ACM/IEEE 43rd Annual International Symposium on Computer Architecture (ISCA), pp. 393-405, Jun. 18-22, 2016, Seoul, Republic of Korea.

Yeongjae Choi et al., "Energy-Efficient Design of Processing Element for Convolutional Neural Network", IEEE Transactions on circuits and Systems II: Express Briefs, vol. 64, No. 11, Apr. 6, 2017.

Jaehyeong Sim, et al., "14.6 A 1.42TOPS/W Deep Convolutional Neural Network Recognition Processor for Intelligent IoE Systems", 2016 IEEE International Solid-State Circuits Conference (ISSCC), pp. 264-266, Jan. 31-Feb. 4, 2016, San Francisco, CA, USA.

Bert Moons, et al., "An Energy-Efficient Precision-Scalable ConvNet Processor in 40-nm CMOS", IEEE Journal of Solid-State Circuits, vol. 52, No. 4, pp. 903-914, Dec. 29, 2016.

Patrick Judd, et al., "Stripes: Bit-Serial Deep Neural Network Computing", 2016 49th Annual IEEE/ACM International Symposium on Microarchitecture (MICRO), Oct. 15-19, 2016, Taipei, Taiwan.

Dongwoo Lee, et al., "ComPEND: Computation Pruning through Early Negative Detection for ReLU in a Deep Neural Network Accelerator", ICS '18 Proceedings of the 2018 International Conference on Supercomputing, pp. 139-148, Jun. 12-15, 2018 Beijing, China.

* cited by examiner

FIG. 4B
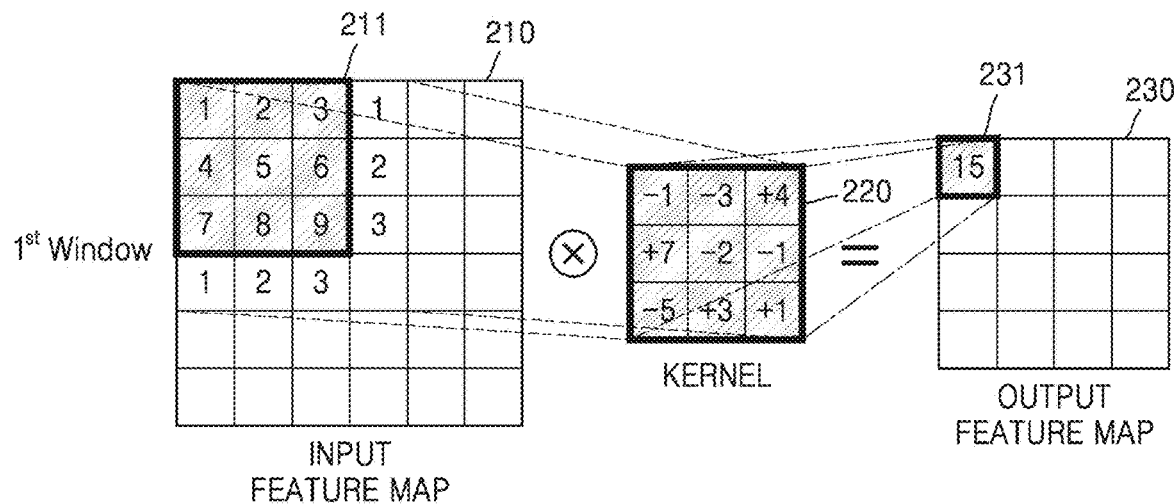
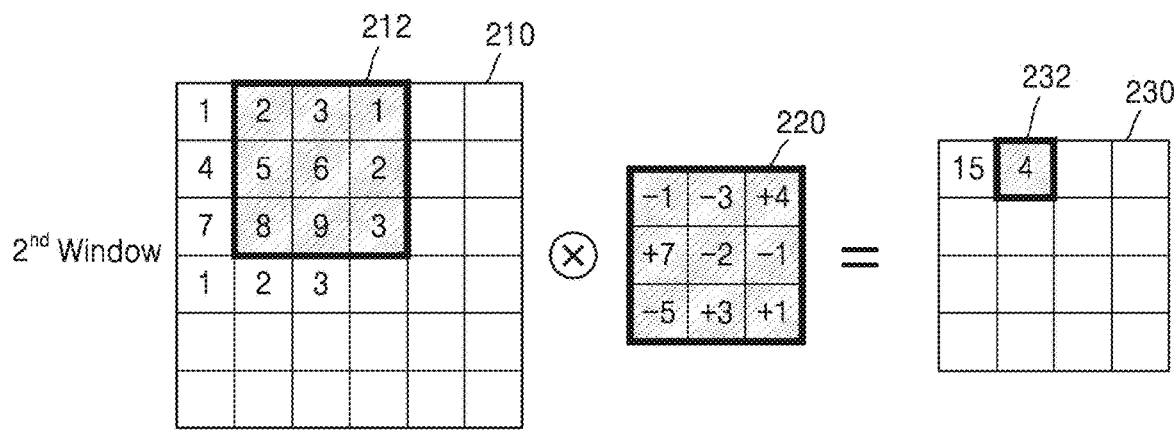
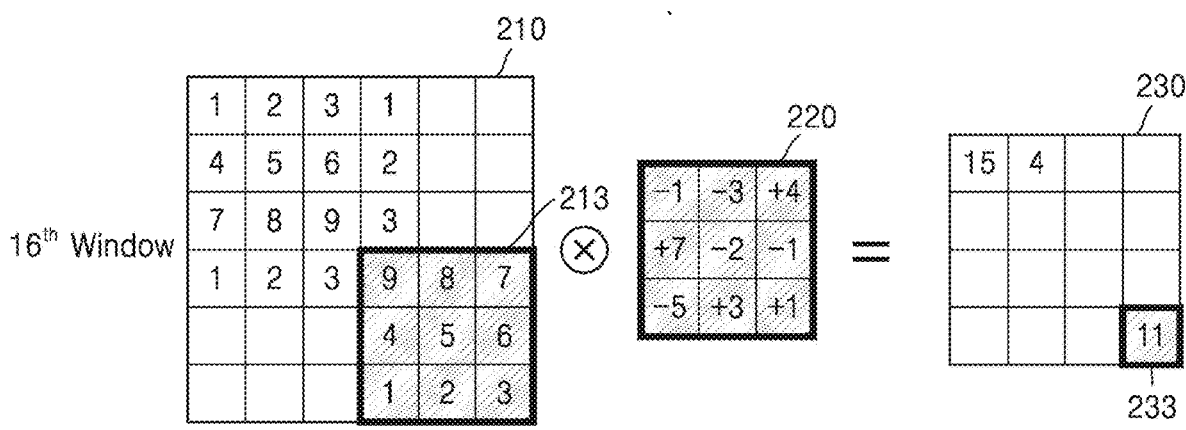

FIG. 6A

Kernel Intermediate Data Memory — 126

Kernel Intermediate Data (KID)

| Kernel Intermediate Value | Value |
|---|---|
| KIV_1 | 0 |
| KIV_2 | w_1 |
| KIV_3 | w_2 |
| KIV_4 | w_2+w_1 |

FIG. 6B

Kernel Intermediate Data Memory — 126

Kernel Intermediate Data (KID)

| Kernel Intermediate Value | Value |
|---|---|
| KIV_1 | 0 |
| KIV_2 | w_1 |
| KIV_3 | w_2 |
| KIV_4 | w_2+w_1 |
| KIV_5 | w_3 |
| KIV_6 | w_3+w_1 |
| KIV_7 | w_3+w_2 |
| KIV_8 | w_3+w_2+w_1 |

FIG. 11A

| Kernel Intermediate Value | Value |
|---|---|
| KIV_1 | $0 \cdot w\_3 + 0 \cdot w\_2 + 0 \cdot w\_1$ |
| KIV_2 | $0 \cdot w\_3 + 0 \cdot w\_2 + 1 \cdot w\_1$ |
| KIV_3 | $0 \cdot w\_3 + 1 \cdot w\_2 + 0 \cdot w\_1$ |
| KIV_4 | $0 \cdot w\_3 + 1 \cdot w\_2 + 1 \cdot w\_1$ |
| KIV_5 | $1 \cdot w\_3 + 0 \cdot w\_2 + 0 \cdot w\_1$ |
| KIV_6 | $1 \cdot w\_3 + 0 \cdot w\_2 + 1 \cdot w\_1$ |
| KIV_7 | $1 \cdot w\_3 + 1 \cdot w\_2 + 0 \cdot w\_1$ |
| KIV_8 | $1 \cdot w\_3 + 1 \cdot w\_2 + 1 \cdot w\_1$ |

Kernel Intermediate Data Memory — 126a
Kernel Intermediate Data (KID)

FIG. 11B

Kernel Intermediate Data Memory — 126b

Kernel Intermediate Data (KID)

| Kernel Intermediate Value | Value |
|---|---|
| KIV_1 | $-1 \cdot w\_3 - 1 \cdot w\_2 - 1 \cdot w\_1$ |
| KIV_2 | $-1 \cdot w\_3 - 1 \cdot w\_2 + 1 \cdot w\_1$ |
| KIV_3 | $-1 \cdot w\_3 + 1 \cdot w\_2 - 1 \cdot w\_1$ |
| KIV_4 | $-1 \cdot w\_3 + 1 \cdot w\_2 + 1 \cdot w\_1$ |
| KIV_5 | $1 \cdot w\_3 - 1 \cdot w\_2 - 1 \cdot w\_1$ |
| KIV_6 | $1 \cdot w\_3 - 1 \cdot w\_2 + 1 \cdot w\_1$ |
| KIV_7 | $1 \cdot w\_3 + 1 \cdot w\_2 - 1 \cdot w\_1$ |
| KIV_8 | $1 \cdot w\_3 + 1 \cdot w\_2 + 1 \cdot w\_1$ |

FIG. 11C

Kernel Intermediate Data Memory — 126c

Modified Kernel Intermediate Data (MKID)

| Modified Kernel Intermediate Value | Value |
|---|---|
| MKIV_1 | $-1 \cdot w\_3 - 1 \cdot w\_2 - 1 \cdot w\_1$ |
| MKIV_2 | $-1 \cdot w\_3 - 1 \cdot w\_2 + 1 \cdot w\_1$ |
| MKIV_3 | $-1 \cdot w\_3 + 1 \cdot w\_2 - 1 \cdot w\_1$ |
| MKIV_4 | $-1 \cdot w\_3 + 1 \cdot w\_2 + 1 \cdot w\_1$ |

NEURAL NETWORK PROCESSOR AND CONVOLUTION OPERATION METHOD THEREOF

CROSS-REFERENCE TO RELATED PATENT APPLICATION

This application claims the benefit of Korean Patent Application No. 10-2018-0132559, filed on Oct. 31, 2018, in the Korean Intellectual Property Office, the disclosure of which is incorporated herein in its entirety by reference.

BACKGROUND

The inventive concepts relate to neural network processors and convolution operation methods thereof, and more particularly, to neural network processors for performing a neural network operation and convolution operation methods of the neural network devices.

A neural network refers to a computational architecture that models a biological brain. Recently, as neural network technologies develop, studies are actively being performed in which various kinds of electronic systems analyze input data and extract valid information by using a neural network device using one or more neural network models.

Neural network devices perform a huge number of operations with respect to complex input data. Accordingly, it would be desirable to more efficiently process neural network operations to allow neural network devices to analyze an input in real time and extract information.

SUMMARY

The inventive concepts provides a method and apparatus for reducing an amount of operations and/or increasing energy efficiency in a neural network processor and a convolution operation method of the neural network processor.

According to an aspect of the inventive concepts, there is provided a neural network processor for performing a neural network operation, the neural network processor may include: a memory storing computer-readable instructions, and kernel intermediate data, the kernel intermediate data comprising a plurality of kernel intermediate values calculated based on a plurality of weight values included in kernel data; and at least one processor configured to execute the computer-readable instructions to perform a convolution operation by selecting at least one kernel intermediate value among the plurality of kernel intermediate values based on an input feature map.

According to another aspect of the inventive concepts, there is provided a convolution operation method of a neural network processor for performing a neural network operation, the convolution operation method may include: generating a plurality of kernel intermediate values by performing an operation using a plurality of weight values included in kernel data; selecting at least one kernel intermediate value among the plurality of kernel intermediate values based on one or more input feature values included in an input feature map; and generating an updated output intermediate value by performing at least one operation using the at least one kernel intermediate value and an output intermediate value.

According to another aspect of the inventive concepts, there is provided a neural network processor for performing a neural network operation, the neural network processor may include: a memory storing computer-readable instructions and a plurality of kernel intermediate values calculated based on a plurality of weight values included in kernel data; and at least one processor configured to execute the computer-readable instructions to perform a convolution operation based on an input feature map and the plurality of kernel intermediate values, and select a first kernel intermediate value from among the plurality of kernel intermediate values based on one or more input feature values included in the input feature map.

BRIEF DESCRIPTION OF THE DRAWINGS

Example embodiments of the inventive concepts will be more clearly understood from the following detailed description taken in conjunction with the accompanying drawings in which:

FIGS. 4A and 4B are schematic diagrams for explaining a convolution operation of a neural network;

FIGS. 6A and 6B illustrate a kernel intermediate data memory according to an embodiment of the inventive concepts;

FIGS. 11A to 11C illustrate kernel intermediate data memory according to an embodiment of the inventive concepts;

DETAILED DESCRIPTION OF EMBODIMENTS

Hereinafter, the inventive concepts will be described more fully with reference to the accompanying drawings, in which example embodiments of the inventive concepts are shown.

Figure 1:
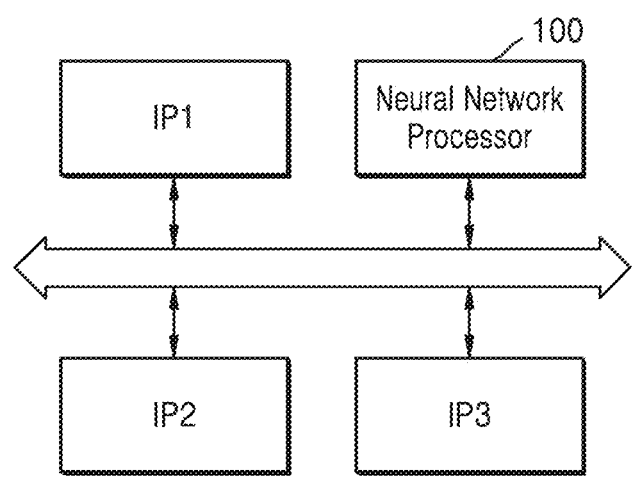
FIG. 1 illustrates an electronic system according to an embodiment of the inventive concepts.

FIG. 1 illustrates an electronic system 10 according to an embodiment of the inventive concepts. The electronic system 10 may analyze input data in real time based on a neural network and extract information, and based on the extracted information, may determine situations and/or control components of an electronic device on which the electronic system 10 is mounted. For example, the electronic system 10 may be applied to drones, robot apparatuses (such as advanced driver assistance systems (ADASs)), smart televisions (TVs), smart phones, medical devices, mobile devices, image display devices, measuring devices, Internet of Things (IoT) devices, etc., and in addition, may be mounted on one or more of various kinds of electronic devices.

Figure 2:
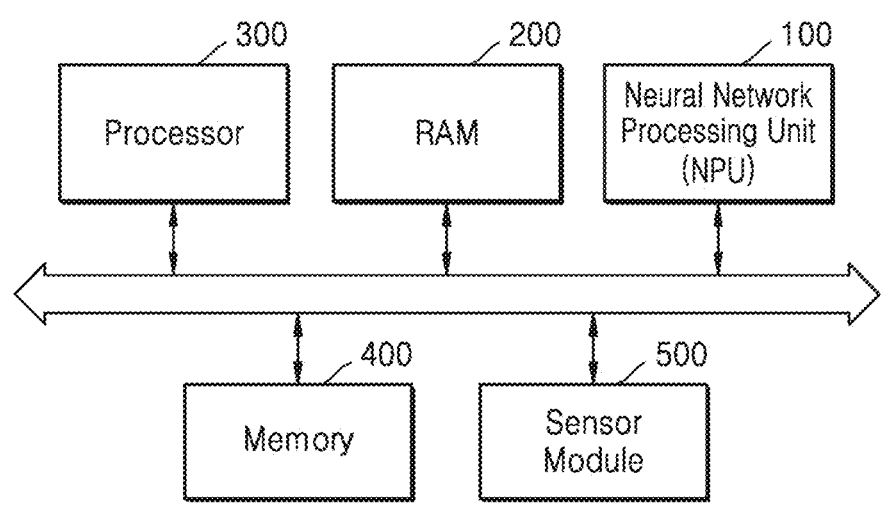
FIG. 2 illustrates an electronic system according to an embodiment of the inventive concepts.

The electronic system 10 may include one or more intellectual properties (IPs) and/or a neural network processor 100 (e.g., in FIG. 2, the neural network processing unit (NPU) 100). For example, the electronic system 10 may include first through third IPs IP1 through IP3 and the neural network processor 100.

The electronic system 10 may include various kinds of IPs. For example, the IPs may include at least one processing unit (also referred to herein as the processing unit), a plurality of cores included in the processing unit, Multi-Format Codec (MFC), a video module (e.g., a camera interface, a Joint Photographic Experts Group (JPEG) processor, a video processor, and/or a mixer), a three-dimensional (3D) graphic core, an audio system, a driver, a display driver, volatile memory, non-volatile memory, a memory controller, input and/or output interface blocks, and/or cache memory. Each of the first through third IPs IP1 through IP3 may include at least one of various kinds of IPs.

Examples of a technique for connecting IPs involve a connection method based on a system bus. For example, an Advanced Microcontroller Bus Architecture (AMBA) protocol by the Advanced RISC Machine (ARM) may be applied as a standard bus specification. Examples of bus types of the AMBA protocol may include an Advanced High-Performance Bus (AHB), an Advanced Peripheral Bus (APB), an Advanced eXtensible Interface (AXI), AXI4, and AXI Coherency Extensions (ACE). The AXI from among the above-described bus types is an interface protocol between IPs and may provide a multiple outstanding address function, a data interleaving function, etc. Besides connection methods discussed above, other types of protocols, such as uNetwork by SONICs Inc., CoreConnect by IBM, and/or an Open Core Protocol by OCP-IP, are applicable to a system bus, and may be used to for connecting IPs.

The neural network processor 100 may generate the neural network, may train (or learn) the neural network, may perform a computation based on received input data and generate an information signal based on a result of the computation, and/or may retrain the neural network. The neural network may include various types of models, such as a convolution neural network (CNN) (e.g., GoogleNet, AlexNet, and VGG Network), a region with a convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, and/or a classification network, but embodiments are not limited thereto. The neural network processor 100 may include one or more processors for performing a computation according to the models of the neural network. The neural network processor 100 may also include a special memory for storing programs corresponding to the models of the neural network. The neural network processor 100 may be referred to as a neural network processing device, a neural network processor, a neural network processing unit (NPU), or the like.

The neural network processor 100 may receive various kinds of input data from the one or more IPs via the system bus, and may generate an information signal based on the input data. For example, the neural network processor 100 may generate the information signal by performing a neural network operation on the input data, and the neural network operation may include a convolution operation. A convolution operation of the neural network processor 100 will be described later in detail with reference to FIGS. 4A and 4B. The information signal generated by the neural network processor 100 may include one of various kinds of recognition signals such as a voice recognition signal, an object recognition signal, an image recognition signal, and/or a bio-information recognition signal. For example, the neural network processor 100 may receive frame data included in a video stream as input data, and may generate, from the frame data, a recognition signal regarding an object included in an image represented by the frame data. However, embodiments are not limited thereto, and the neural network processor 100 may receive various kinds of input data and may generate a recognition signal according to the input data.

In the electronic system 10 according to an embodiment of the inventive concepts, the neural network processor 100 may generate kernel intermediate data by performing an operation preliminarily using weight values included in kernel data used for a convolution operation, and store the kernel intermediate data. For example, the neural network processor 100 may generate and store the kernel intermediate data by previously performing various combinations of operations that may be performed on the weight values in the convolution operation. In an embodiment, the kernel intermediate data may include a plurality of kernel intermediate values, and each of the plurality of kernel intermediate values may be a value obtained through a linear combination of a plurality of weight values. The kernel intermediate data will be described in more detail with reference to FIGS. 6A, 6B, and 11A to 11C. The neural network processor 100 may perform the convolution operation by selecting at least one kernel intermediate value from the plurality of kernel intermediate values based on input feature values included in an input feature map.

As described above, according to the electronic system 10 according to an embodiment of the inventive concepts, prior to the convolution operation, the kernel intermediate values may be provided by previously performing an operation on the weight values of the kernel data used in the convolution operation, thereby reducing an amount of computations of the convolution operation, and in addition, increasing the energy efficiency of the neural network processor 100.

FIG. 2 illustrates the electronic system 10 according to an embodiment of the inventive concepts. In an embodiment, FIG. 2 illustrates an embodiment of the electronic system 10 of FIG. 1. Accordingly, descriptions of the electronic system 10 that are the same as or similar to those made with reference to FIG. 1 are omitted herein.

The electronic system 10 may include the neural network processing unit (NPU) 100, a random access memory (RAM) 200, a processor 300, a memory 400, and/or a sensor module 500. The NPU 100 may be the neural network processor 100 of FIG. 1.

The RAM 200 may store programs, data, and/or instructions temporarily. For example, the programs and/or data stored in the memory 400 may be temporarily stored in the RAM 200 under the control of the processor 300 and/or depending on a booting code. The RAM 200 may be implemented by using dynamic random access memory (DRAM) and/or static random access memory (SRAM).

The processor 300 may control an overall operation of the electronic system 10. For example, the processor 300 may be a central processing unit (CPU). The processor 300 may include a single processor core or a plurality of processor cores. The processor 300 may process or execute the programs and/or data stored in the RAM 200 and the memory 400. For example, the processor 300 may control functions of the electronic system 10 by executing the programs stored in the memory 400.

The memory 400 is a storage for storing data, and may store, for example, an operating system (OS), various kinds of programs, and/or various kinds of data. The memory 400 may be, but is not limited to, DRAM. The memory 400 may include at least one of volatile memory and/or non-volatile memory. The non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FeRAM), etc. The volatile memory may include DRAM, SRAM, synchronous DRAM (SDRAM), PRAM, MRAM, RRAM, ferroelectric RAM (FeRAM), etc. According to an embodiment, the memory 400 may include at least one of a hard disk drive (HDD), a solid state drive (SSD), a compact flash (CF), a secure digital (SD) card, a micro-secure digital (Micro-SD) card, a mini-secure digital (Mini-SD) card, an extreme digital (xD) card, and/or a memory Stick.

The sensor module 500 may collect information about the vicinity of the electronic system 10. The sensor module 500 may sense and/or receive an image signal from outside the electronic system 10, and convert the sensed and/or received image signal to image data, that is, an image frame. To this end, the sensor module 500 may include a sensing apparatus, that is, at least one of various kinds of sensing apparatuses such as a photographing apparatus, an image sensor, a light detection and ranging (LIDAR) sensor, an ultrasonic sensor, and/or an infrared sensor, or may receive a sensing signal from the sensing apparatus. According to an embodiment, the sensor module 500 may provide an image frame to the neural network processor 100. For example, the sensor module 500 may include an image sensor, and may photograph an external environment of the electronic system 10 to generate a video stream, and may sequentially provide successive image frames of the video stream to the neural network processor 100.

In the electronic system 10 according to an embodiment of the inventive concepts, the NPU 100 may perform an operation using weight values included in kernel data used for a convolution operation, thereby generating and storing kernel intermediate data. The NPU 100 may perform the convolution operation by selecting at least one kernel intermediate value from a plurality of kernel intermediate values based on input feature values included in an input feature map.

As described above, according to the electronic system 10 according to an embodiment of the inventive concepts, prior to the convolution operation, the kernel intermediate values may be provided by previously performing an operation on the weight values of kernel data used in the convolution operation, thereby reducing an amount of computations of the convolution operation, and in addition, increasing the energy efficiency of the NPU 100.

Figure 3:
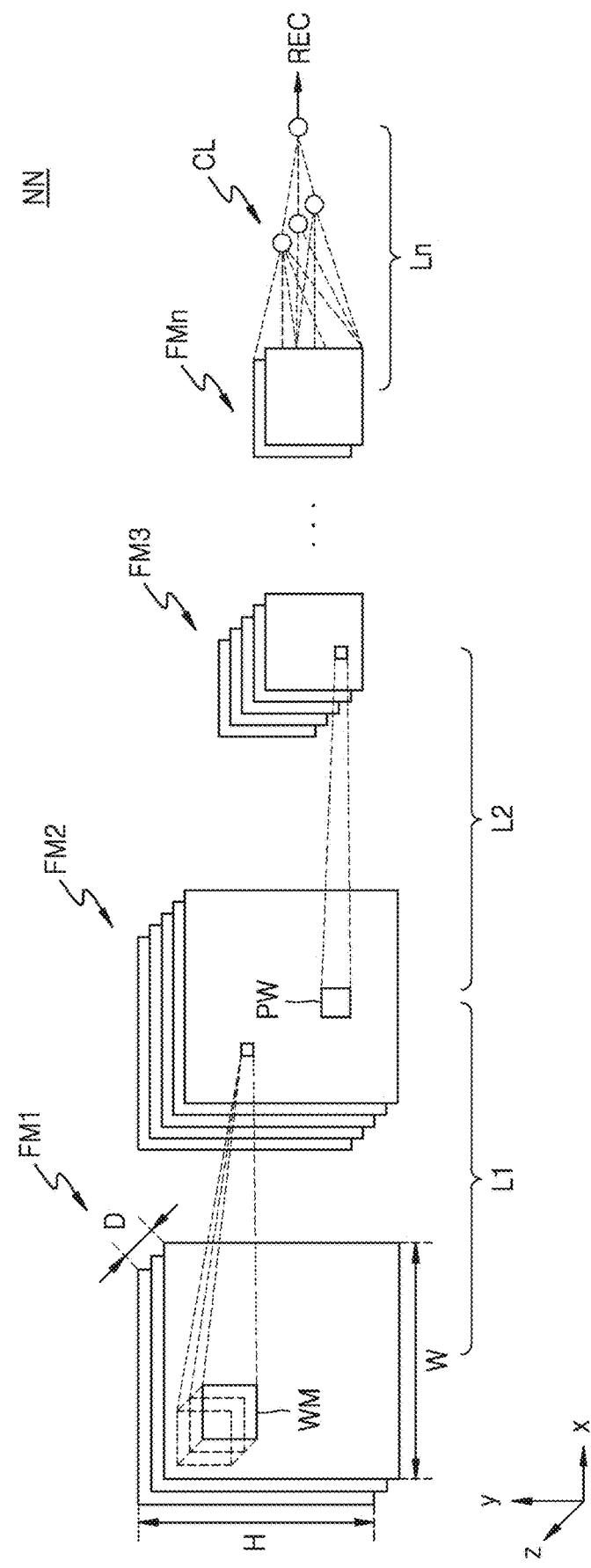
FIG. 3 illustrates a structure of a convolutional neural network as an example of a neural network structure.

FIG. 3 illustrates a structure of a convolution neural network as an example of a neural network structure. A neural network NN may include a plurality of layers L1 to Ln. Each of the plurality of layers L1 to Ln may be a linear layer or a non-linear layer. According to an embodiment, at least one linear layer is coupled to at least one non-linear layer and a result of the coupling may be denoted by one layer. For example, a linear layer may include a convolution layer, a fully connected layer, and a non-linear layer may include a pooling layer and an activation layer.

For example, a first layer L1 may be a convolution layer, a second layer L2 may be a pooling layer, and an n-th layer may be a fully connected layer as an output layer. The neural network NN may further include an activation layer and may further include a layer configured to perform another kind of operation.

Each of the plurality of layers L1 to Ln may receive, as an input feature map, a feature map generated from input data (e.g., an image frame) or a previous layer, and perform an operation on the input feature map to generate an output feature map or a recognition signal REC. In an embodiment, the feature map denotes data in which various features of input data have been expressed. First, second, third, through to n-th feature maps FM1, FM2, FM3, through to FMn may each have, for example, a two-dimensional (2D) matrix or three-dimensional (3D) matrix (or referred to as a tensor) form. Each of the first, second, third, through to n-th feature maps FM1, FM2, FM3, through to FMn may have a width W (or referred to as a column), a height H (or referred to as a row), and a depth D. These may correspond to an x-axis, a y-axis, and a z-axis on a coordinate system, respectively. In an embodiment, the depth D may be denoted by the number of channels.

The first layer L1 may perform convolution on the first feature map FM1 and a weight map WM to generate the second feature map FM2. The weight map WM may filter the first feature map FM1 and may be denoted by a filter or a kernel. A depth of the weight map WM, that is, the number of channels of the weight map WM, is the same as a depth of the first feature map FM1, that is, the number of channels, and convolution may be performed on the same channels of the weight map WM and the first feature map FM1. The weight map WM may be shifted in a crossing manner by using the first input feature map FM1 as a sliding window. A shifting amount may be denoted by a "stride length" or a "stride". During each shift, weights included in the weight map WM may be multiplied by and added to all pieces of feature data of a portion of the first feature map FM1 overlapped by the weight map WM. The pieces of feature data of the portion of the first feature map FM1 overlapped by the weight values included in the weight map WM may be referred to as extracted data. As convolution is performed on the first feature map FM1 and the weight map WM, one channel of the second feature map FM2 may be generated. Though FIG. 3 illustrates one weight map WM, convolution may be actually performed on a plurality of weight maps and the first feature map FM1, and thus a plurality of channels of the second feature map FM2 may be generated. In other words, the number of channels of the second feature map FM2 may correspond to the number of weight maps WM.

The second layer L2 may generate the third feature map FM3 by changing a spatial size of the second feature map FM2 through pooling. The pooling may be denoted by sampling or down-sampling. A 2D pooling window PW may be shifted on the second feature map FM2 in units of a size of the pooling window PW, and a maximum (or upper limit) value (or, alternatively, an average value of pieces of feature data) among pieces of feature data of a portion of the second feature map FM2 overlapped by the pooling window PW may be selected. Accordingly, the third feature map FM3 in which a spatial size has changed may be generated from the second feature map FM2. The number of channels of the third feature map FM3 is the same as the number of channels of the second feature map FM2.

The n-th layer Ln may combine features of the n-th feature map FMn to classify a class CL of the input data. The n-th layer may generate a recognition signal REC corresponding to the class. According to an embodiment, the input data may correspond to frame data included in a video stream, and the n-th layer Ln may recognize an object and generate a recognition signal REC corresponding to the recognized object, by extracting a class corresponding to the object included in an image represented by the frame data based on the n-th feature map FMn provided from a previous frame.

Figure 4A:
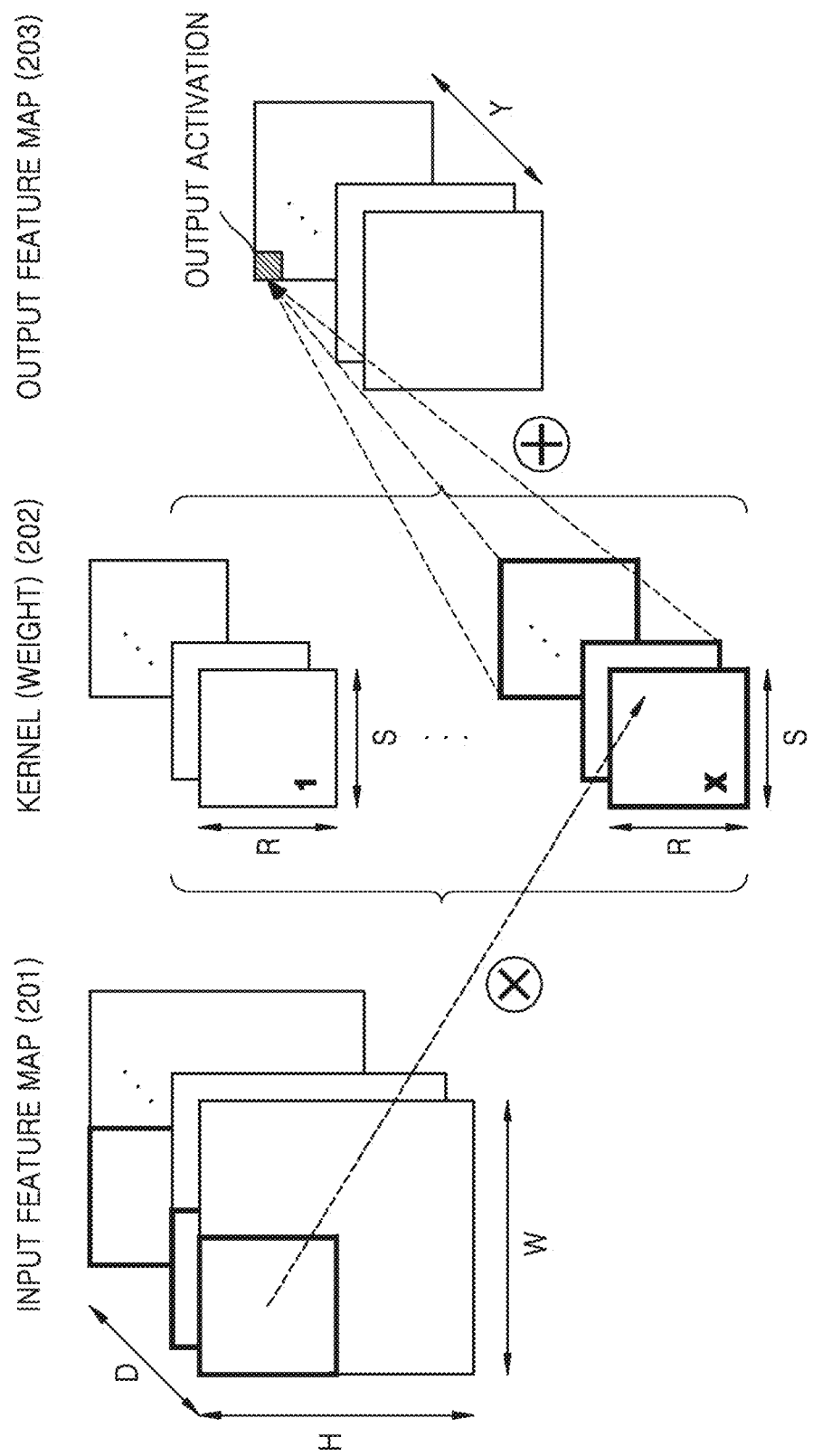

FIGS. 4A and 4B are schematic diagrams for explaining a convolution operation of a neural network.

Referring to FIG. 4A, input feature maps 201 may include D channels, and an input feature map of each channel may have a column size of H and a row size of W (where D, H, and W are natural numbers). Each of kernels 202 may have a column size of R and a row size of S, and the kernels 202 may include channels, the number of which corresponds to the number D of channels (or a depth) of the input feature maps 201, wherein R and S are natural numbers. Output feature maps 203 may be generated via a 3D convolution operation between the input feature maps 201 and the kernels 202, and may include Y channels according to the 3D convolution operation.

A process of generating an output feature map via a 2D convolution operation between one input feature map and one kernel may be described with reference to FIG. 4B, and the 2D convolution operation of FIG. 4B may be performed on the input feature maps 201 of the entire channels and the kernels 202 of the entire channels and thus the output feature maps 203 of the entire channels may be generated.

Referring to FIG. 4B, for convenience of explanation, it is assumed that an input feature map 210 has a 6×6 size, an original kernel 220 has a 3×3 size, and an output feature map 230 has a 4×4 size, but embodiments are not limited thereto. The neural network may be implemented with various sizes of feature maps and various sizes of kernels. Values defined in the input feature map 210, the original kernel 220, and the output feature map 230 are all example values, and embodiments of the inventive concepts are not limited thereto.

The original kernel 220 may perform a convolution operation while sliding on the input feature map 210 in units of a window of a 3×3 size. The convolution operation may represent an operation of calculating each feature data of the output feature map 230 by first multiplying pieces of feature data of a window of the input feature map 210 by respective weight values at locations on the original kernel 220 corresponding to the pieces of feature data, and then adding up the products of the multiplications. The pieces of feature data included in the window of the input feature map 210 that are multiplied by the weight values may be referred to as extracted data extracted from the input feature map 210. For example, the original kernel 220 may first undergo convolution together with first extracted data 211 of the input feature map 210. In other words, pieces of feature data of 1, 2, 3, 4, 5, 6, 7, 8, and 9 of the first extracted data 211 may be multiplied by weight values of −1, −3, 4, 7, −2, −1, −−5, 3, and 1 of the original kernel 220, respectively, and, as a result, −1, −6, 12, 28, −10, −6, −35, 24, and 9 may be obtained. Next, the obtained values of −1, −6, 12, 28, −10, −6, −35, 24, and 9 may be added up to make 15, and feature data 231 on a first row and a first column of the output feature map 230 may be determined to be 15. The feature data 231 on the first row and the first column of the output feature map 230 corresponds to the first extracted data 211. Similarly, convolution may be performed on second extracted data 212 of the input feature map 210 and the original kernel 220, and thus feature data 232 on the first row and a second column of the output feature map 230 may be determined to be 4. Finally, convolution may be performed on sixteenth extracted data 213, which is last extracted data of the input feature map 210, and the original kernel 220, and thus feature data 233 on a fourth row and a fourth column of the output feature map 230 may be determined to be 11.

In other words, convolution on the single input feature map 210 and the single original kernel 220 may be achieved by repeating a multiplication between extracted data of the input feature map 210 and weight values of the original kernel 220, and an addition of results of the multiplications, and the output feature map 230 may be generated as a result of the convolution.

As described above, in the convolution operation, the weight values included in the kernel are multiplied with the input feature values included in the input feature map 210 several times. In the convolution operation, as the number of multiplication operations increases, an amount of the operation increases, which causes a reduction in the energy efficiency of the neural network processor 100.

Referring to FIGS. 1, 4A, and 4B, according to the neural network processor 100 according to an embodiment of the inventive concepts, prior to the convolution operation, the neural network processor 100 may use the weight values included in the kernel data to generate and store kernel intermediate data. The neural network processor 100 may use the input feature map and the kernel intermediate data in the convolution operation. In an embodiment, the neural network processor 100 may perform the convolution operation by selecting at least one kernel intermediate value from a plurality of kernel intermediate values based on the input feature values in the input feature map. According to the neural network processor 100 according to an embodiment of the inventive concepts, a prior operation may be performed using the weight values and an amount of multiplication operations in the convolution operation may be reduced by storing the kernel intermediate values. Accordingly, the amount of operations in the convolution operation of the neural network processor 100 may be reduced, and the energy efficiency of the neural network processor 100 may be improved. A convolution operation method of the neural network processor 100 according to an embodiment of the inventive concepts and a device therefor will be described in more detail with reference to the drawings below.

Figure 5:
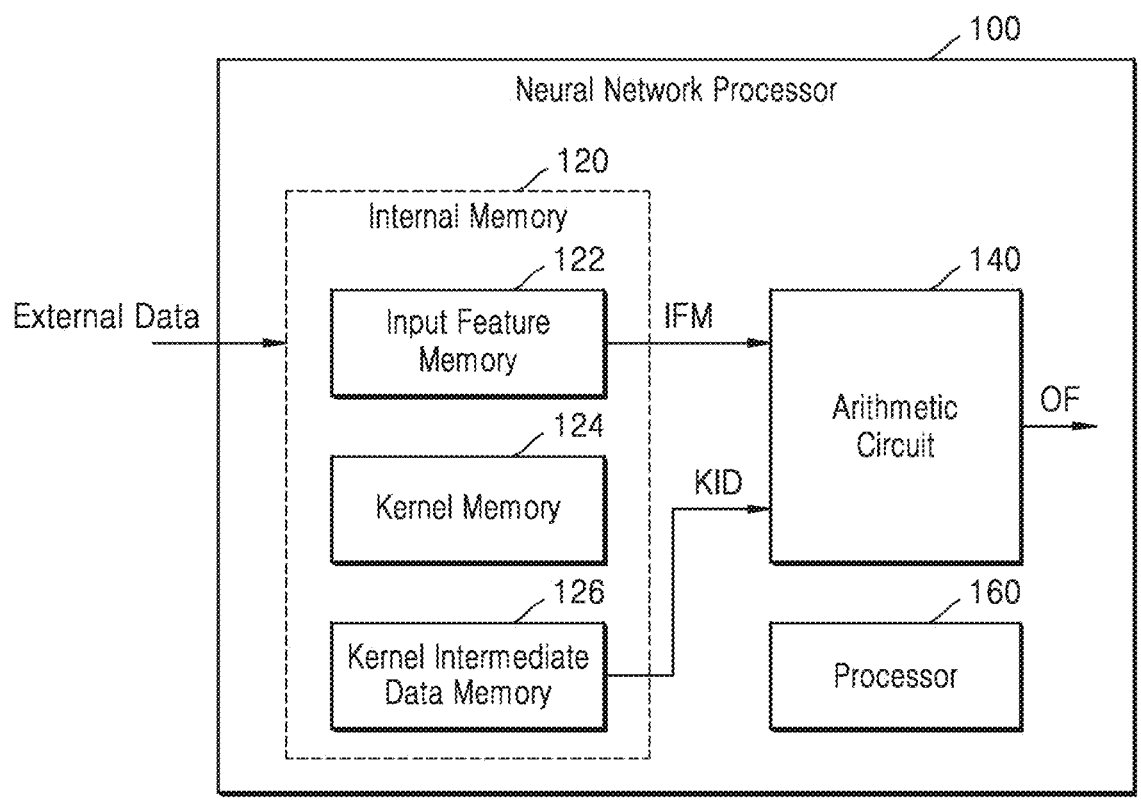
FIG. 5 illustrates a neural network processor according to an embodiment of the inventive concepts.

FIG. 5 illustrates the neural network processor 100 according to an embodiment of the inventive concepts. The neural network processor 100 may include an internal memory 120, an arithmetic circuit 140, and/or at least one processor 160 (also referred to herein as the processor 160). Descriptions of the neural network processor 100 of FIG. 5 that are the same as or similar to those made with reference to FIGS. 1 and 2 are not repeated herein. According to some example embodiments, operations described herein as being performed by either or both of the neural network processor 100 and the arithmetic circuit 140 may be performed by at least one processor (e.g., the processor 160) executing program code that includes instructions corresponding to the operations. The instructions may be stored in a memory of the neural network processor 100 (e.g., the internal memory 120). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The internal memory 120 may receive external data from outside the neural network processor 100. The external data may also be referred to as input data. The internal memory 120 may store the external data, various kinds of data for use in a computation, and/or weight values. To this end, the internal memory 120 may include an input feature memory 122 storing an input feature map IFM, a kernel memory 124 storing kernel data, and/or a kernel intermediate data memory 126 storing kernel intermediate data KID. The input feature memory 122, the kernel memory 124, and the kernel intermediate data memory 126 may be configured as independent hardware, but are not limited thereto. For example, two or more memories among the input feature memory 122, the kernel memory 124, and/or the kernel intermediate data memory 126 may represent memories corresponding to different areas within a single hardware device. Each of the input feature memory 122, the kernel memory 124, and the kernel intermediate data memory 126 may be implemented using various types of memory, such as DRAM, SRAM, and/or SDRAM.

The input feature memory 122 may store the input feature map IFM and provide the input feature map IFM to the arithmetic circuit 140.

The kernel memory 124 may store kernel data used for the convolution operation. The kernel data may include a plurality of weight values.

The kernel intermediate data memory 126 may store the kernel intermediate data KID computed based on the plurality of weight values included in the kernel data. In an embodiment, the kernel intermediate data KID may be computed externally and transmitted to (e.g., received by) the neural network processor 100 and/or may be computed by an internal arithmetic unit, such as the processor 160. The kernel intermediate data KID may include a plurality of kernel intermediate values. Each of the plurality of kernel intermediate values may be a value obtained by linear combinations of the plurality of weight values. The kernel intermediate data memory 126 may provide the kernel intermediate data KID to the arithmetic circuit 140.

The arithmetic circuit 140 may receive the input feature map IFM from the input feature memory 122 and receive the kernel intermediate data KID from the kernel intermediate data memory 126. The arithmetic circuit 140 may perform the convolution operation using the received input feature map IFM and the received kernel intermediate data KID. The arithmetic circuit 140 may generate an output feature OF by performing the convolution operation and generate an output feature map by repeating a process of generating the output feature OF.

The input feature map IFM received by the arithmetic circuit 140 may include a plurality of input feature values. The arithmetic circuit 140 may select at least one kernel intermediate value from the plurality of kernel intermediate values included in the kernel intermediate data KID based on input feature values used in a current operation among a plurality of input feature values. In an embodiment, when the input feature values are 1-bit data, the arithmetic circuit 140 may output the selected at least one kernel intermediate value as the output feature OF. In an embodiment, when the input feature values are data having a number of bits greater than or equal to 2-bits, the arithmetic circuit 140 may sum shifted output intermediate values obtained by shifting an output intermediate value stored in an internal register to the selected at least one kernel intermediate value by a number of bits greater than or equal to 1-bit, and generate the output feature OF by performing the summation operation at least once. The number of bits of the input features values may vary according to particular applications of the neural network processor 100. The convolution operation performed by the arithmetic circuit 140 will be described in more detail with reference to the drawings below.

The processor 160 may control the overall operation of the neural network processor 100. For example, the processor 160 may be a central processing unit (CPU). The processor 160 may include single processor core or multi processor cores. The processor 160 may control functions of the neural network processor 100 by executing programs stored in the internal memory 120.

FIGS. 6A and 6B illustrate the kernel intermediate data memory 126 according to an embodiment of the inventive concepts. The kernel intermediate data memory 126 may store the kernel intermediate data KID. In an embodiment, FIG. 6A shows an embodiment where kernel data used for a convolution operation includes two weight values, and FIG. 6B shows an embodiment where the kernel data used for the convolution operation includes three weight values. However, FIGS. 6A and 6B merely illustrate examples for convenience of explanation, and the number of weights included in the kernel data will not be limited thereto.

Referring to FIG. 6A, the kernel data used for the convolution operation may include two weight values. For example, the kernel data may include a first weight value $w\_1$ and a second weight value $w\_2$. For example, the kernel data may be a matrix of two rows and one column, or a matrix of one row and two columns.

The kernel intermediate data KID may include a plurality of kernel intermediate values. Each of the plurality of kernel intermediate values may be a value obtained by linear combination of a plurality of weight values. For example, each of the plurality of kernel intermediate values may be expressed as [Equation 1] below.

$$KIV = a\_1 * w\_1 + a\_2 * w\_2 \quad \text{[Equation 1]}$$

(KIV: kernel intermediate value, $w\_1$: first weight value, $w\_2$: second weight value, $a\_1$, $a\_2$: real numbers)

In an embodiment, coefficients $a\_1$ and $a\_2$ that are multiplied by the weight values may be numbers represented by M-bits (where M is a natural number). FIG. 6A, for example, shows an embodiment in which $a\_1$ and $a\_2$ are numbers represented by 1-bit. Thus, each of $a\_1$ and $a\_2$ may have a value of '0' or '1', and the kernel intermediate data KID may include four kernel intermediate values obtained from a combination of a 1 and a 2.

For example, when $(a\_2, a\_1)$ corresponds to $(0, 0)$, a first kernel intermediate value KIV_1 may have a value of '0'. Similarly, for example, when $(a\_2, a\_1)$ corresponds to $(0, 1)$, a second kernel intermediate value KIV_2 may have a value of '$w\_1$', and when $(a\_2, a\_1)$ corresponds to $(1, 0)$, a third kernel intermediate value KIV_3 may have a value of '$w\_2$', and when $(a\_2, a\_1)$ corresponds to $(1, 1)$, a fourth kernel intermediate value KIV_4 may have a value of '$w\_1+w\_2$'.

When expressing differently the plurality of kernel intermediate values, each of the plurality of kernel intermediate values may be a value generated by inner product of a vector (w_2, w_1) formed by arranging the plurality of weight values and a vector (a_2, a_1) formed by arranging coefficients multiplied to each of the weight values. For example, as depicted in FIG. 6A, each of the plurality of kernel intermediate values may be a value generated by inner product of the vector (w_2, w_1) formed by arranging the plurality of weight values and a vector of two columns in which each element has '0' or '1'.

The kernel intermediate data KID computed above may be used for a convolution operation of the arithmetic circuit 140 in FIG. 5.

Referring to FIG. 6B, the kernel data used in the convolution operation may include three weight values. For example, the kernel data may include a first weight value (w_1), a second weight value (w_2), and a third weight value (w_3). For example, the kernel data may be a matrix of three rows and one column, or a matrix of one row and three columns.

The kernel intermediate data KID may include a plurality of kernel intermediate values. Each of the plurality of kernel intermediate values may be a value obtained by linear combination of the plurality of weight values. For example, each of the plurality of kernel intermediate values may be expressed as [Equation 2] below.

$$KIV = a\_1 * w\_1 + a\_2 * w\_2 + a\_3 * w\_3 \quad [\text{Equation 2}]$$

(KIV: kernel intermediate value, w_1: first weight value, w_2: second weight value, w_3: third weight value, a_1, a_2, a_3: real numbers)

In an embodiment, coefficients a_1, a_2 and a_3 which are multiplied by the weight values may be numbers represented by M-bits. FIG. 6B, for example, shows an embodiment in which a_1, a_2 and a_3 are numbers represented by 1-bit. Thus, each of a_1, a_2 and a_3 may have a value of '0' or '1', and the kernel intermediate data KID may include eight kernel intermediate values obtained from combinations of a_1, a_2 and a_3.

For example, when (a_3, a_2, a_1) corresponds to (0, 0, 0), the first kernel intermediate value KIV_1 may have a value of '0'. Similarly, for example, when (a_3, a_2, a_1) corresponds to (0, 0, 1), the second kernel intermediate value KIV_2 may have a value of 'w_1'. Thereafter, the third kernel intermediate value KIV_3 to the eighth kernel intermediate value KIV_8 may have values respectively when (a_3, a_2, a_1) corresponds to (0,1,0), (0,1,1), (1,0,0), (1,0,1), (1,1,0), and (1,1,1).

When expressing differently the plurality of kernel intermediate values, each of the plurality of kernel intermediate values may be a value generated by inner product of a vector (w_3, w_2, w_1) formed by arranging the plurality of weight values and a vector (a_3, a_2, a_1) formed by arranging coefficients multiplied to each of the weight values. For example, as depicted in FIG. 6B, each of the plurality of kernel intermediate values may be value generated by inner product of the vector (w_3, w_2, w_1) formed by arranging the plurality of weight values and a vector of three columns in which each element has '0' or '1'.

The kernel intermediate data KID computed above may be used for a convolution operation of the arithmetic circuit 140 in FIG. 5.

Figure 7:
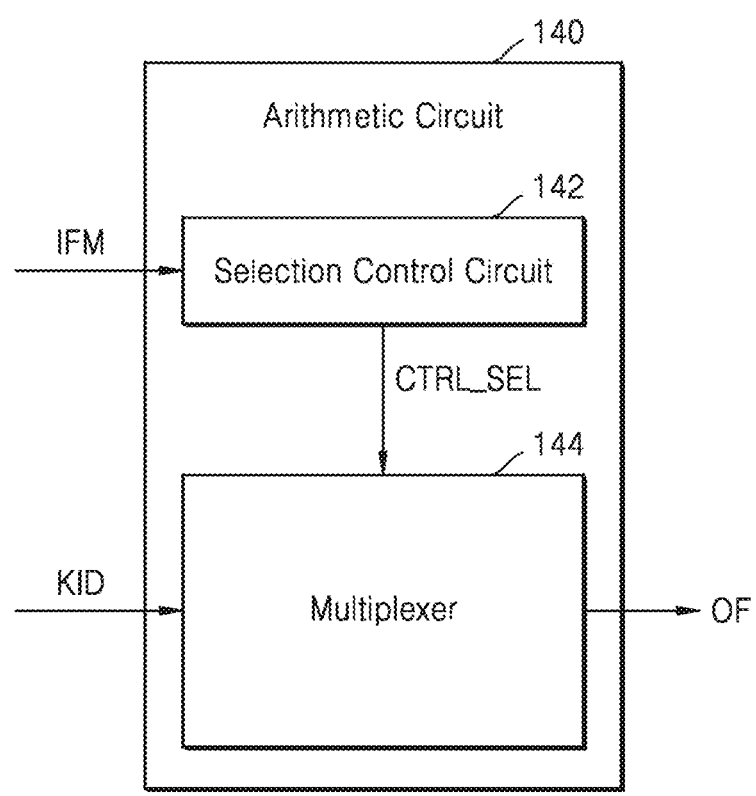
FIG. 7 shows an arithmetic circuit according to an embodiment of the inventive concepts.

FIG. 7 shows the arithmetic circuit 140 according to an embodiment of the inventive concepts. A description of the arithmetic circuit 140 of FIG. 7 which is redundant with that of FIG. 5 is omitted.

The arithmetic circuit 140 may include a selection control circuit 142 and/or a multiplexer 144.

The selection control circuit 142 may generate a selection control signal CTRL_SEL based on the input feature map IFM. The input feature map IFM may include a plurality of input feature values. The selection control circuit 142 may generate the selection control signal CTRL_SEL to cause the multiplexer 144 to select one of a plurality of kernel intermediate values included in the kernel intermediate data KID, based on input feature values used for a current operation among the plurality of input feature values. The selection control circuit 142 may provide the generated selection control signal CTRL_SEL to the multiplexer 144.

The selection control circuit 142 may be implemented in various forms. According to some example embodiments, operations described herein as being performed by either or both of the selection control circuit 142 and the multiplexer 144 may be performed by at least one processor (e.g., the processor 160) executing program code that includes instructions corresponding to the operations. The instructions may be stored in a memory of the neural network processor 100 (e.g., the internal memory 120). For example, the selection control circuit 142 may be implemented in the form of hardware and/or a combination of hardware and software. Specifically, when the selection control circuit 142 is implemented in the form of hardware, the selection control circuit 142 may include circuits (e.g., an application-specific integrated circuit (ASIC) or a field programmable gate array (FPGA)) that perform the operations described herein as being performed by the selection control circuit 142, such as generating the selection control signal CTRL_SEL based on the plurality of input feature values. Also, for example, when the selection control circuit 142 is implemented in the form of a combination of hardware and software, programs and/or instructions loaded into an internal memory of a neural network processor (e.g., the internal memory 120) may be executed by control logic included in the arithmetic circuit 140 or a processor of the neural network processor (e.g., a microprocessor, a central processing unit (CPU), a processor core, a multi-core processor; a multiprocessor), and thus the selection control signal CTRL_SEL may be generated. However, the inventive concepts are not limited to the above-described embodiments. The selection control circuit 142 may be implemented in the form of a combination of software and hardware such as firmware.

The multiplexer 144 may generate an output feature OF based on the kernel intermediate data KID and the selection control signal CTRL_SEL. In an embodiment, the multiplexer 144 may generate the output feature OF by selecting one of the plurality of kernel intermediate values included in the kernel intermediate data KID, based on the selection control signal CTRL_SEL.

As a non-limited example, the input feature map IFM may perform a convolution operation with kernel data of one row and three columns. Referring to FIGS. 6B and 7, when input feature values to be multiplied with the kernel data in the input feature map IFM are '0', '1', and '1', the selection control circuit 142 may generate the selection control signal CTRL_SEL such that the multiplexer 144 selects the fourth kernel intermediate value KIV_4 from among the kernel intermediate values, and the multiplexer 144 may select the fourth kernel intermediate value KIV_4 from among the kernel intermediate values based on the selection control signal CTRL_SEL. The multiplexer 144 may output the fourth kernel intermediate value KIV_4 as the output feature OF. Thus, the arithmetic circuit 140 according to an embodiment of the inventive concepts may perform the convolution operation by selecting one of the plurality of kernel intermediate values, even without performing a multiplication operation. Conventional neural network processors perform convolution operations based on input data and weight values included in kernel data to generate an output feature (e.g., for use in generating a recognition signal). Such convolution operations involve a large number of operations (e.g., multiplication operations) resulting in high delay and resource consumption (e.g., processor, memory and energy resources). However, some example embodiments describe improved neural network processors providing kernel intermediate values. Upon receiving input data, an improved neural network processor performs a convolution operation by determining a kernel intermediate value corresponding to the input data and outputting the determined kernel intermediate value as an output feature. By using the kernel intermediate values, the improved neural network processor reduces the number of multiplication operations performed (or avoids performing such multiplication operations altogether), thereby reducing delay and resource consumption in comparison to the conventional neural network processors. Such a reduction in delay and resource consumption may be especially useful in neural network processor applications involving mobile devices in which resources are limited (e.g., drones, robot apparatuses, ADASs, smart phones and/ or IoT devices) and/or applications in which high delay is particularly undesirable (e.g., drones, robot apparatuses and/ or medical devices).

Figure 8:
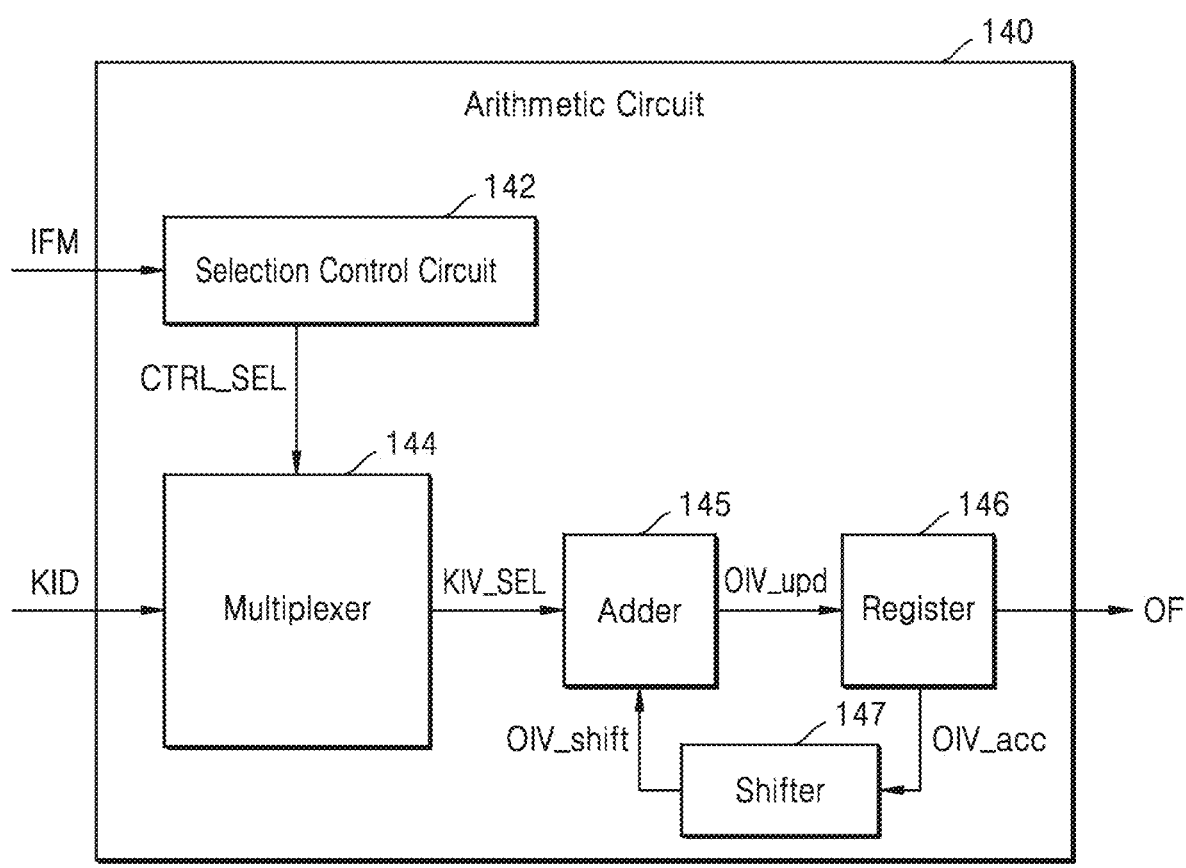
FIG. 8 shows an arithmetic circuit according to an embodiment of the inventive concepts.

FIG. 8 shows the arithmetic circuit 140 according to an embodiment of the inventive concepts. A description of the arithmetic circuit 140 of FIG. 8 which is redundant with those of FIGS. 5 and 7 is omitted. FIG. 8 shows, in particular, the arithmetic circuit 140 when input feature values included in the input feature map IFM have a bit number of 2-bit or more.

The arithmetic circuit 140 may include the selection control circuit 142, the multiplexer 144, an adder 145, a register 146 and/or a shifter 147.

The selection control circuit 142 may generate the selection control signal CTRL_SEL based on the input feature values used in a current operation among a plurality of input feature values included in the input feature map IFM. The selection control circuit 142 may generate the selection control signal CTRL_SEL based on values of upper bits (e.g., most and/or more significant bits) of the input feature values and then generate the selection control signal CTRL_SEL based on values of lower bits (least and/or less significant bits) of the input feature values.

The multiplexer 144 may generate a selected kernel intermediate value KIV_SEL by selecting one of a plurality of kernel intermediate values included in the kernel intermediate data KID based on the selection control signal CTRL_SEL. The multiplexer 144 may provide the selected kernel intermediate value KIV_SEL to the adder 145.

In an embodiment, the adder 145, the register 146 and the shifter 147 update an output intermediate value until operations on values of the most significant bits of the plurality of input feature values to values of the least significant bits are accumulated.

The register 146 may store the output intermediate value. The register 146 may provide an accumulation output intermediate value OIV_acc accumulated up to now to the shifter 147.

The shifter 147 may generate an output intermediate value OIV_shift obtained by shifting the accumulation output intermediate value OIV_acc provided by the register 146 by the number of bits of 1-bit or more, and may provide the shifted output intermediate value OIV_shift to the adder 145.

The adder 145 may not perform a summation operation on the selected kernel intermediate value KIV_SEL in an operation on the most significant bits of the plurality of input feature values. In other words, in the operation on the most significant bits of the plurality of input feature values, the adder 145 may generate an output intermediate value OIV_upd updated by adding '0' to the selected kernel intermediate value KIV_SEL.

The adder 145 may generate the updated output intermediate value OIV_upd by performing an operation to sum the shifted output intermediate value OIV_shift to the selected kernel intermediate value KIV_SEL in an operation on bits that are not the most significant bits of the plurality of input feature values. The adder 145 may provide the updated output intermediate value OIV_upd to the register 146. The register 146 may store the updated output intermediate value OIV_upd.

The register 146 may output the updated output intermediate value OIV_upd in an operation on the least significant bit of the plurality of input feature values as the output feature OF. According to some example embodiments, operations described herein as being performed by any or all of the adder 145, the register 146 and the shifter 147 may be performed by at least one processor (e.g., the processor 160) executing program code that includes instructions corresponding to the operations. The instructions, and the output intermediate value OIV_upd stored by the register 146, may be stored in a memory of the neural network processor 100 (e.g., the internal memory 120).

When the input feature values have a bit number of 2-bit or more, a convolution operation method of the arithmetic circuit 140 will be described in more detail with reference to FIG. 10.

Figure 9:
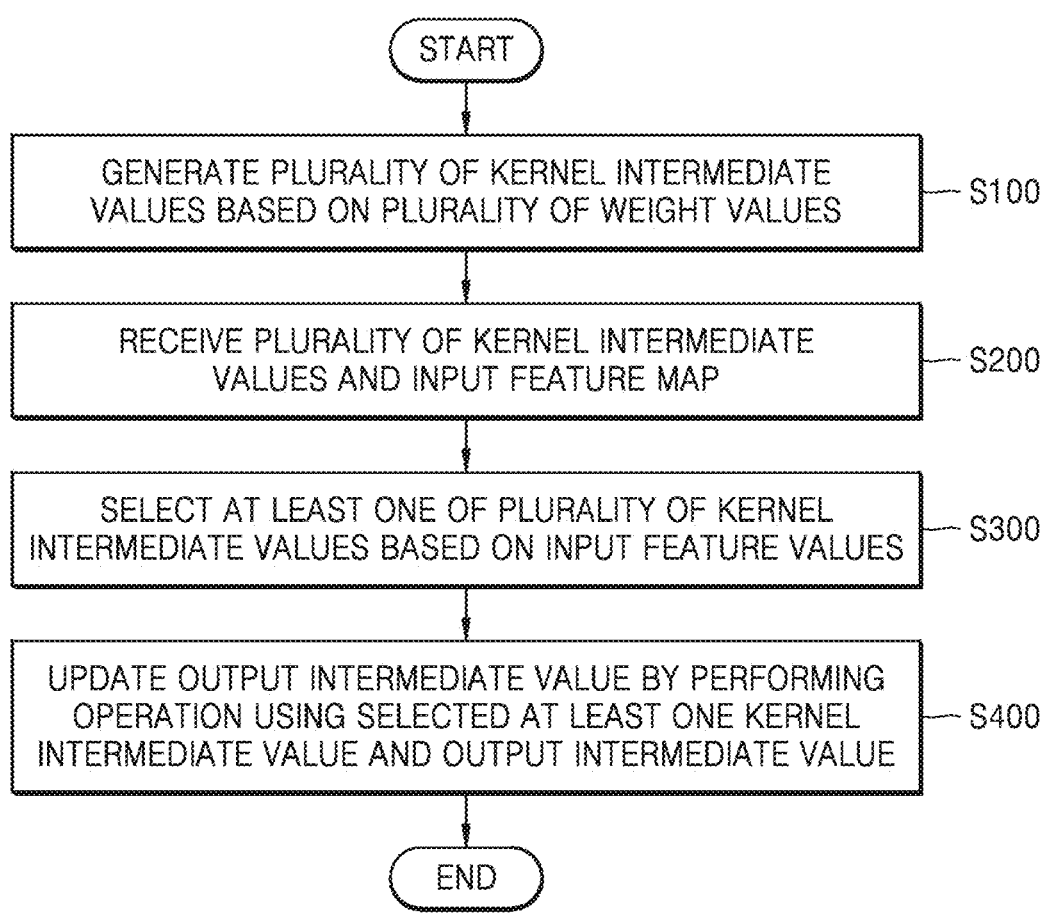
FIG. 9 shows a flowchart of a convolution operation method of a neural network processor according to an embodiment of the inventive concepts.

FIG. 9 shows a flowchart of a convolution operation method of the neural network processor 100 according to an embodiment of the inventive concepts. FIG. 9 is described with reference to FIGS. 5 and 8 together.

The neural network processor 100 may generate a plurality of kernel intermediate values based on a plurality of weight values included in kernel data (S100). In an embodiment, the processor 160 included in the neural network processor 100 may generate the plurality of kernel intermediate values by performing an operation of linearly combining the plurality of weight values. The kernel intermediate data memory 126 included in the internal memory 120 of the neural network processor 100 may store the generated plurality of kernel intermediate values.

The arithmetic circuit 140 included in the neural network processor 100 may receive the plurality of kernel intermediate values and the input feature map IFM (S200). The arithmetic circuit 140 may receive the input feature map IFM from the input feature memory 122 and receive the kernel intermediate data KID including the plurality of kernel intermediate values from the kernel intermediate data memory 126.

The neural network processor 100 may select at least one kernel intermediate value from the plurality of kernel intermediate values, based on input feature values used in a current operation among a plurality of input feature values included in the input feature map IFM (S300). For example, the selection control circuit 142 included in the arithmetic circuit 140 may generate the selection control signal CTRL_SEL based on the input feature values and the multiplexer 144 included in the arithmetic circuit 140 may select at least one of the plurality of kernel intermediate values based on the selection control signal CTRL_SEL.

The neural network processor 100 may update an output intermediate value by performing an operation using the selected kernel intermediate value KIV_SEL and the output intermediate value (S400). In an embodiment, the register 146 included in the arithmetic circuit 140 may store the output intermediate value and may provide the accumulation output intermediate value OIV_acc to the shifter 147. The shifter 147 may provide the shifted output intermediate value OIV_shift by shifting the accumulation output intermediate value OIV_acc by 1 bit to the adder 145. The adder 145 may generate the updated output intermediate value OIV_upd by summing the shifted output intermediate value OIV_shift to the selected kernel intermediate value KIV_SEL.

Figure 10:
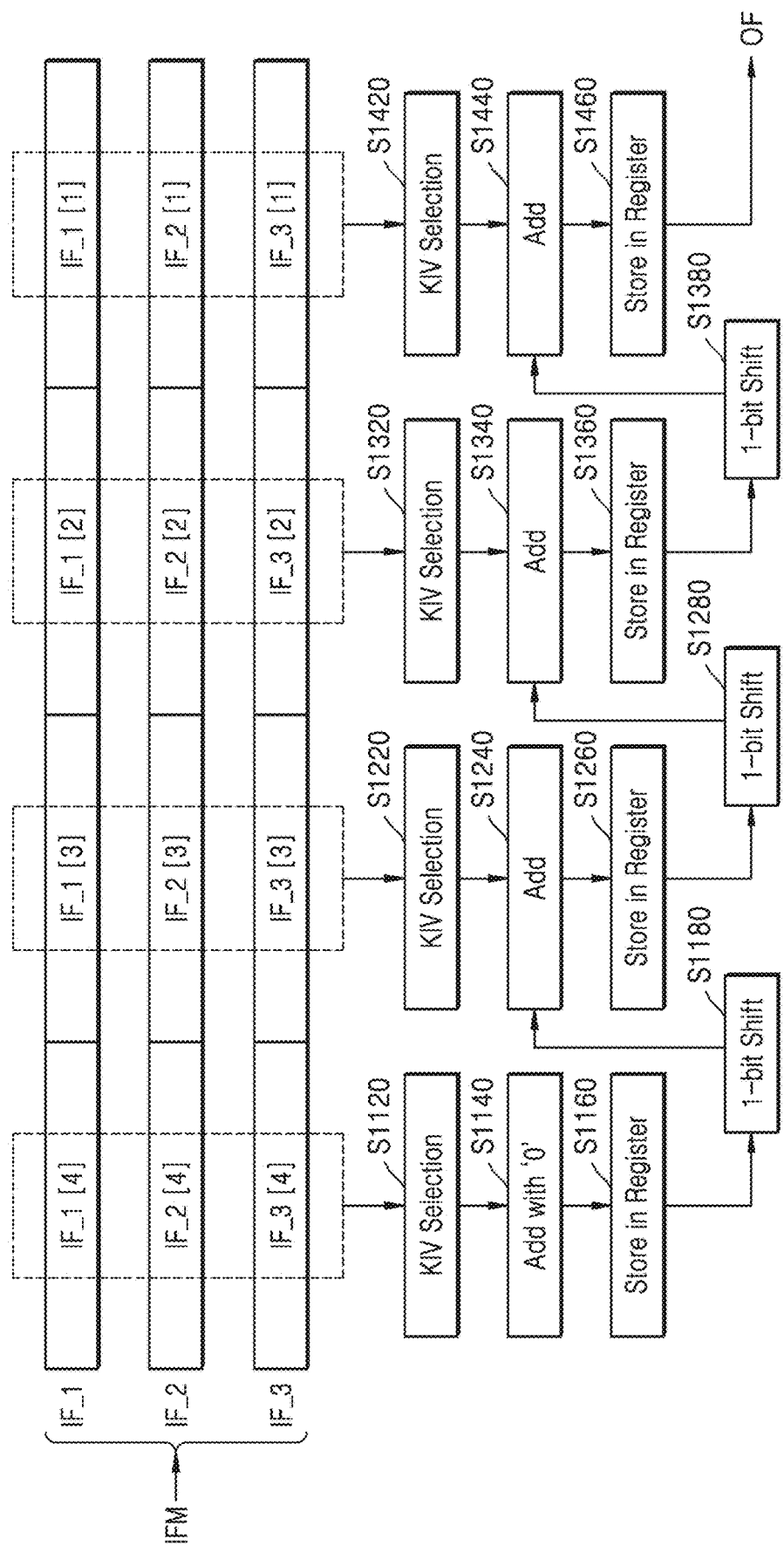
FIG. 10 shows a flowchart of input feature values and a convolution operation method of a neural network processor according to an embodiment of the inventive concepts.

FIG. 10 shows a flowchart of input feature values IF_1, IF_2, and IF_3 and a convolution operation method of a neural network processor according to an embodiment of the inventive concepts. FIG. 10 shows a process in which a neural network processor multiplies kernel data to a first input feature value IF_1, a second input feature value IF_2, and a third input feature value IF_3 included in the input feature map IFM in a convolution operation and an embodiment where a plurality of input feature values are 4-bit data. The number of bits of the plurality of input feature values is merely an example for convenience of description and should not be construed as limited thereto. FIG. 10 is described with reference to FIG. 8 together.

The arithmetic circuit 140 first performs an operation on the most significant bits IF_1 [4], IF_2 [4], and IF_3 [4] of the input feature values. The selection control circuit 142 may generate the selection control signal CTRL_SEL based on IF_1 [4], IF_2 [4] and IF_3 [4], and the multiplexer 144 may select one of a plurality of kernel intermediate values based on the selection control signal CTRL_SEL (S1120). Hereinafter, for convenience of explanation, operations of the selection control circuit 142 and the multiplexer 144 such as operation S1120 will be referred to as kernel intermediate value selection operations. The adder 145 may add '0' to the selected kernel intermediate value KIV_SEL (S1140). In other words, the adder 145 may generate the selected kernel intermediate value KIV_SEL as the updated output intermediate value OIV_upd without performing a summation operation on the selected kernel intermediate value KIV_SEL. The register 146 may store the updated output intermediate value OIV_upd (S1160). The register 146 may provide the stored output intermediate value to the shifter 147 as the accumulation output intermediate value OIV_acc, and the shifter 147 may generate the shifted output intermediate value OIV_shift by shifting the accumulation output intermediate value OIV_acc by 1 bit (S1180).

The selection control circuit 142 and the multiplexer 144 may perform the kernel intermediate value selection operation on IF_1 [3], IF_2 [3], and IF_3 [3] which are the next most-significant bits of the input feature values (S1220). The adder 145 may generate the updated output intermediate value OIV_upd by summing the shifted output intermediate value OIV_shift to the selected kernel intermediate value KIV_SEL (S1240). The register 146 may store the updated output intermediate value OIV_upd (S1260). The register 146 may provide the stored output intermediate value to the shifter 147 as the accumulation output intermediate value OIV_acc, and the shifter 147 may generate the shifted output intermediate value OIV_shift by shifting the accumulation output intermediate value OIV_acc by 1 bit (S1280).

The selection control circuit 142 and the multiplexer 144 may perform a kernel intermediate value selection operation S1320, an addition operation S1340, a register storage operation S1360, and a shift operation S1380 on IF_1 [2], IF_2 [2] and IF3[2] which are next most-significant bits of the input feature values in the same manner as or a similar manner to the operations on IF_1 [3], IF_2 [3] and IF_3 [3].

The selection control circuit 142 and the multiplexer 144 may perform the kernel intermediate value selection operation on IF_1 [1], IF_2 [1] and IF_3 [1] which are the least significant bits of the input feature values (S1420). The adder 145 may generate the updated output intermediate value OIV_upd by summing the shifted output intermediate value OIV_shift to the selected kernel intermediate value KIV_SEL (S1440). The register 146 may store the updated output intermediate value OIV_upd (S1460). The register 146 may also output the updated output intermediate value OIV_upd as the output feature OF in the operation on the least significant bit of the input feature values.

FIGS. 11A to 11C illustrate kernel intermediate data memory 126a, 126b, and 126c according to an embodiment of the inventive concepts. FIGS. 11A to 11C illustrate an embodiment where kernel data includes three weight values, but this is for convenience of description only and the kernel data is not limited thereto. In other words, the number of weight values may vary depending on the kernel data according to particular applications of the neural network processor 100.

Referring to FIG. 11A, the kernel intermediate data memory 126a may store the kernel intermediate data KID including a plurality of kernel intermediate values. The kernel intermediate data KID shown in FIG. 11A may be substantially the same as or similar to FIG. 6B. Each of the first kernel intermediate value KIV_1 to the eighth kernel intermediate value KIV_8 may be a value obtained by linear combination of the first weight value w_1, the second weight value w_2 and the third weight value w_3, and coefficients used in linear combination may be '0' and '1'.

Referring to FIG. 11B, the kernel intermediate data memory 126b may store the kernel intermediate data KID including the plurality of kernel intermediate values. Each of the first kernel intermediate value KIV_1 to the eighth kernel intermediate value KIV_8 may be the value obtained by linear combination of the first weight value w_1, the second weight value w_2 and the third weight value w_3, and the coefficients used in linear combination may be '−1' and '1'. In other words, upon comparing FIG. 11B with FIG. 11A, a result of replacing the coefficient '0' used in the kernel intermediate data KID of FIG. 11A with '−1' may be the same as the kernel intermediate data KID of FIG. 11B.

It may be seen from the kernel intermediate data KID of FIG. 11B that the first kernel intermediate value KIV_1 to the fourth kernel intermediate value KIV_4 have a symmetric relationship with the fifth kernel intermediate value KIV_5 to the eighth kernel intermediate value KIV_8. For example, the first kernel intermediate value KIV_1 and the eighth kernel intermediate value KIV_8 have the same size but opposite signs. The relationship between the second kernel intermediate value KIV_2 and the seventh kernel intermediate value KIV_7 is also the same. The relationship between the third kernel intermediate value KIV_3 and the sixth kernel intermediate value KIV_6 is also the same. The relationship between the fourth kernel intermediate value KIV_4 and the fifth kernel intermediate value KIV_5 is also the same. Due to the symmetric characteristic of the kernel intermediate values, the number of kernel intermediate values included in the kernel intermediate data KID may be reduced by half compared to FIG. 11B, and an embodiment in which the number of kernel intermediate values is reduced is shown in FIG. 11C.

Referring to FIG. 11C, the kernel intermediate data memory 126c may store modified kernel intermediate data MKID. The modified kernel intermediate data MKID may include a plurality of modified kernel intermediate values. Each of the plurality of modified kernel intermediate values MKID may be a value obtained by linear combination of the first weight value w_1, the second weight value w_2, and the third weight value w_3. Coefficients used in linear combination may be '−1' and '1'. Upon comparing FIG. 11C with FIG. 11B, the first kernel intermediate value KIV_1 to the fourth kernel intermediate value KIV_4 included in the kernel intermediate data KID of FIG. 11B respectively correspond to a first modified kernel intermediate value MKIV_1 to a fourth modified kernel intermediate value MKIV_4 included in the modified kernel intermediate data MKID of FIG. 11C. In other words, when the number of weight values included in the kernel data is N (N is a natural number), a quantity of the modified kernel intermediate data MKID may include $2^{(N-1)}$ modified kernel intermediate values.

As described with reference to FIG. 11B, due to the symmetrical characteristic of the kernel intermediate values of FIG. 11B, the kernel intermediate data memory 126c of FIG. 11C may store data corresponding to half an amount of the kernel intermediate data memory 126b of FIG. 11B.

Other embodiments may be possible. For example, the first modified kernel intermediate value MKIV_1 may correspond to one of the first kernel intermediate value KIV_1 and the eighth kernel intermediate value KIV_8 of FIG. 11B, the second modified kernel intermediate value MKIV_2 may correspond to one of the second kernel intermediate value KIV_2 and the seventh kernel intermediate value KIV_7 in FIG. 11B, the third modified kernel intermediate value MKIV_3 may correspond to one of the third kernel intermediate value KIV_3 and the sixth kernel intermediate value KIV_6 in FIG. 11B, and the fourth modified kernel intermediate value MKIV_4 may correspond to one of the fourth kernel intermediate value KIV_4 and the fifth kernel intermediate value KIV_5 in FIG. 11B.

In an embodiment, in the kernel intermediate data memories 126b and 126c as depicted in FIGS. 11B and 11C, '0' is replaced with '−1' in comparison with the kernel intermediate data memories 126a depicted in FIG. 11A. Accordingly, a value will be calibrated after the kernel intermediate value is selected in a convolution operation. To this end, an arithmetic circuit may further include an offset calibration circuit, as described in a figure below.

Figure 12:
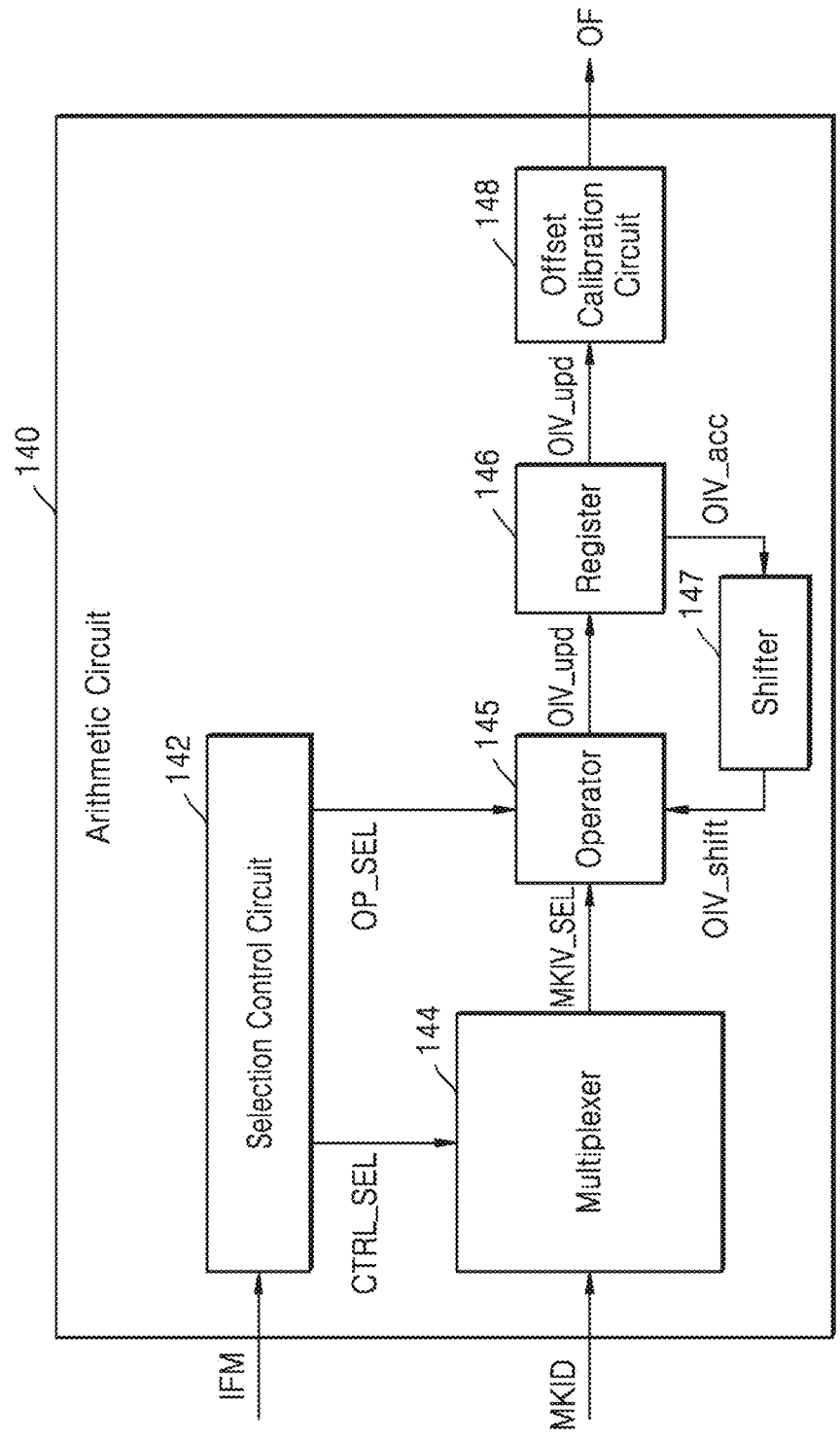
FIG. 12 illustrates an arithmetic circuit according to an embodiment of the inventive concepts.

FIG. 12 illustrates the arithmetic circuit 140 according to an embodiment of the inventive concepts. The arithmetic circuit 140 may include the selection control circuit 142, the multiplexer 144, an operator 145, the register 146, the shifter 147 and/or an offset calibration circuit 148. According to some example embodiments, the operator 145 may be implemented as an adder 145, a second operator 145 and/or a subtractor). FIG. 12 for example illustrates the arithmetic circuit 140 that corresponds to an embodiment in which kernel intermediate data memory stores the modified kernel intermediate data MKID as shown in FIG. 11C. With respect to FIG. 12, a redundant description with FIG. 8 is omitted, and a difference from FIG. 8 will be mainly described.

The multiplexer 144 may select at least one of a plurality of modified kernel intermediate values included in the modified kernel intermediate data MKID received from a kernel intermediate data memory, based on the selection control signal CTRL_SEL provided by the selection control circuit 142. The value selected by the multiplexer 144 is referred to as a selected modification kernel intermediate value MKIV_SEL.

The operator 145 may perform an operation using the shifted output intermediate value OIV_shift and the selected modification kernel intermediate value MKIV_SEL. A kind of the operation performed by the operator 145 may be determined based on an operation selection signal OP_SEL provided by the selection control circuit 142. In an embodiment, the operator 145 may perform a summation operation (e.g., similar to the adder 145) or a subtraction operation based on the operation selection signal OP_SEL.

For example, referring to FIGS. 8, 11C and 12, when values (e.g., the most significant bit, the next most significant bit, or the least significant bit, etc.) corresponding to a specific bit of input feature values used in a current operation among a plurality of input feature values included in the input feature map IFM are (0, 0, 0), the multiplexer 144 may select the first modified kernel intermediate value MKIV_1 from among the plurality of modified kernel intermediate values based on the selection control signal CTRL_SEL, and the operator 145 may add the selected modification kernel intermediate value MKIV_SEL to the shifted output intermediate value OIV_shift based on the operation selection signal OP_SEL.

Further, as another example, when the values (e.g., the most significant bit, the next most significant bit, or the least significant bit, etc.) corresponding to the specific bit of input feature values used in the current operation among the plurality of input feature values included in the input feature map IFM are (1, 1, 0), the multiplexer 144 may select the second modified kernel intermediate value MKIV_2 from among the plurality of modified kernel intermediate values based on the selection control signal CTRL_SEL, and the operator 145 may subtract the selected modification kernel intermediate value MKIV_SEL from the shifted output intermediate value OIV_shift based on the operation selection signal OP_SEL.

The register 146 may provide the updated output intermediate value OIV_upd in the operation on the least significant bit of the plurality of input feature values to the offset calibration circuit 148 as the output intermediate value OIV.

Figure 13:
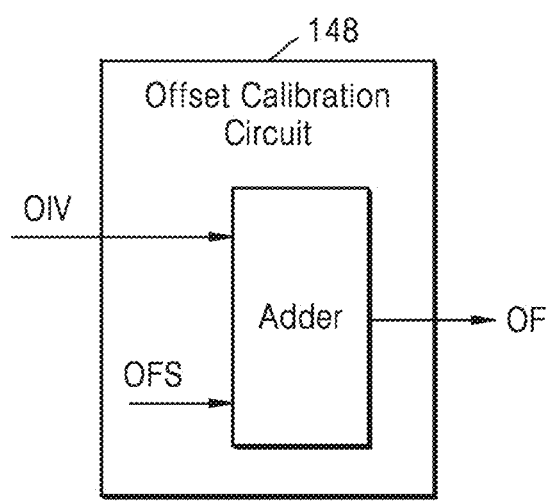
FIG. 13 shows an offset calibration circuit according to an embodiment of the inventive concepts.

The offset calibration circuit 148 may calibrate a value corresponding to an amount of '0' replaced with '−1' in the modified kernel intermediate data MKID to the output intermediate value OIV. To this end, the offset calibration circuit 148 may be implemented as an adder as shown in FIG. 13. In an embodiment, the offset calibration circuit 148 may output the output feature OF by summing an offset value into the output intermediate value OIV. According to some example embodiments, operations described herein as being performed by either or both of the operator 145 and the offset calibration circuit 148 may be performed by at least one processor (e.g., the processor 160) executing program code that includes instructions corresponding to the operations. The instructions may be stored in a memory of the neural network processor 100 (e.g., the internal memory 120).

FIG. 13 shows the offset calibration circuit 148 according to an embodiment of the inventive concepts. A description of the offset calibration circuit 148 of FIG. 13 which is redundant with that of FIG. 12 will be omitted.

The offset calibration circuit 148 may generate the output feature OF based on the output intermediate value OIV. For example, the offset calibration circuit 148 may be implemented as an adder and the offset calibration circuit 148 may generate the output feature OF by summing an offset value OFS to the output intermediate value OIV. In an embodiment, the offset value OFS may be equal to the sum of a plurality of weight values included in kernel data used in a current operation. As depicted in FIG. 11C, the offset value OFS may be equal to a value obtained by dividing the sum of the first weight value w_1, the second weight value w_2, and the third weight value w_3 by '2' as shown in [Equation 3] below. According to some example embodiments, operations described herein as being performed by the adder may be performed by at least one processor (e.g., the processor 160) executing program code that includes instructions corresponding to the operations. The instructions may be stored in a memory of the neural network processor 100 (e.g., the internal memory 120).

$$OFS=(w\_1+w\_2+w\_3)/2 \quad \text{[Equation 3]}$$

Figure 14:
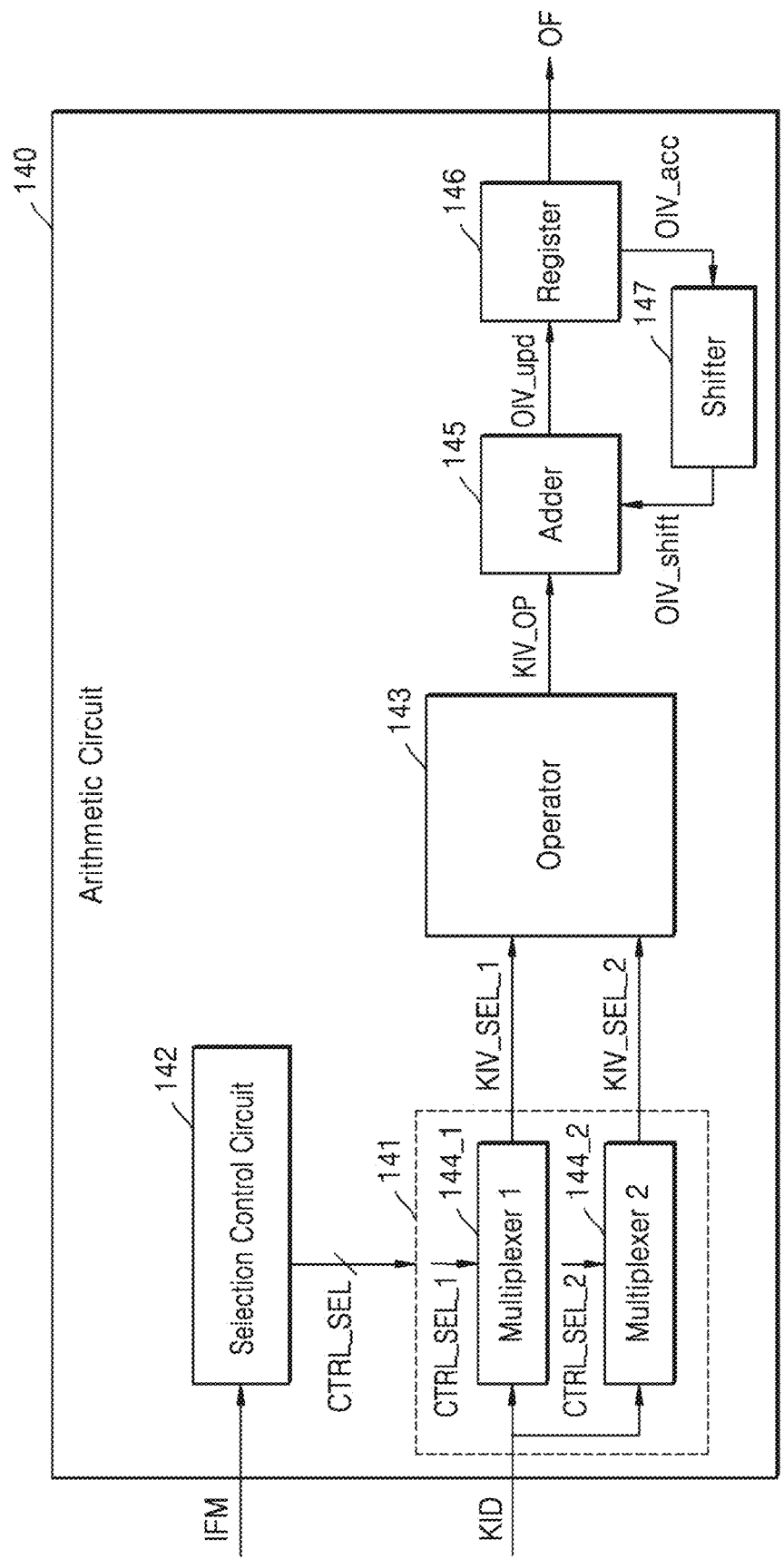
FIG. 14 shows an arithmetic circuit according to an embodiment of the inventive concepts.

FIG. 14 shows an arithmetic circuit 140 according to an embodiment of the inventive concepts. In connection with the arithmetic circuit 140 of FIG. 14, a description redundant with that of FIG. 8 will be omitted, and a difference from FIG. 8 will be mainly described.

Although a_1 and a_2 are described as values represented by 1-bit in [Equation 1] and [Equation 2], in some example embodiments, a_1 and a_2 may be values represented by 2-bit or more.

When a_1 and a_2 are values represented by 2-bit values, the arithmetic circuit 140 may obtain a desired result by selecting kernel intermediate values with respect to upper bits of a_1 and a_2, and then performing operations on the selected kernel intermediate values. In other words, the arithmetic circuit 140 may obtain the first selected kernel intermediate value KIV_SEL_1 through a selection operation corresponding to the upper bits of a_1 and a_2, and obtain the second selected kernel intermediate value KIV_SEL_2 through a selection operation corresponding to the lower bits of a_1 and a_2, and then obtain the kernel intermediate value KIV_OP calculated through an operation of [Equation 4] shown below.

$$KIV\_OP=KIV\_SEL\_1*2+KIV\_SEL\_2 \quad \text{[Equation 4]}$$

For the above operation, the arithmetic circuit 140 may include a multiplexing circuit 141 and/or an operator 143. The multiplexing circuit 141 may include a first multiplexer 144_1 and/or a second multiplexer 144_2. According to some example embodiments, operations described herein as being performed by any or all of the multiplexing circuit 141, the first multiplier 144_1, the second multiplier 144_2 and the operator 143 may be performed by at least one processor (e.g., the processor 160) executing program code that includes instructions corresponding to the operations. The instructions may be stored in a memory of the neural network processor 100 (e.g., the internal memory 120).

The selection control signal CTRL_SEL may include a first selection control signal CTRL_SEL_1 and a second selection control signal CTRL_SEL_2. The first multiplexer 144_1 may select at least one kernel intermediate value from among a plurality of kernel intermediate values included in the kernel intermediate data KID based on the first selection control signal CTRL_SEL_1, and provide the first selected kernel intermediate value KIV_SEL_1 to the operator 143. The second multiplexer 144_2 may select at least one kernel intermediate value from among the plurality of kernel intermediate values included in the kernel intermediate data KID based on the second selection control signal CTRL_SEL_2, and provide the second selected kernel intermediate value KIV_SEL_2 to the operator 143.

The operator 143 may generate the kernel intermediate value KIV_OP calculated by performing an operation using the first selected kernel intermediate value KIV_SEL_1 and the second selected kernel intermediate value KIV_SEL_2. In an embodiment, the operator 143 may perform an operation such as [Equation 4]. An embodiment of the operator 143 will be described with reference to FIG. 15.

Figure 15:
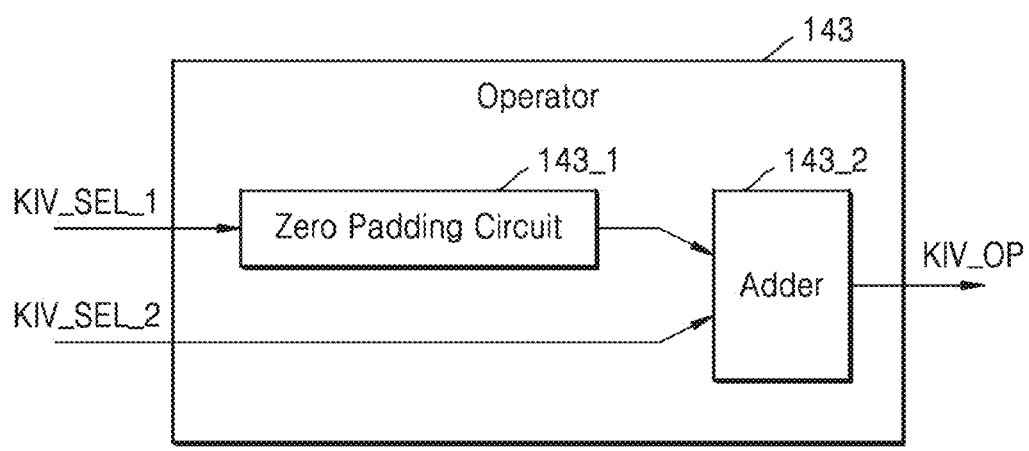
FIG. 15 shows an operator according to an embodiment of the inventive concepts.

FIG. 15 shows the operator 143 according to an embodiment of the inventive concepts. A description of the operator 143 that is redundant with that in FIG. 14 will be omitted.

The operator 143 may include a zero padding circuit 143_1 and/or an adder 143_2. According to some example embodiments, operations described herein as being performed by either or both of the zero padding circuit 143_1 and the adder 143_2 may be performed by at least one processor (e.g., the processor 160) executing program code that includes instructions corresponding to the operations. The instructions may be stored in a memory of the neural network processor 100 (e.g., the internal memory 120).

The zero padding circuit 143_1 may add '0' to the least significant bit of the first selected kernel intermediate value KIV_SEL_1 and provide the first selected kernel intermediate value KIV_SEL_1 to which '0' is added to the adder 143_2. In an embodiment, the zero padding circuit 143_1 may be implemented as a shifter (e.g., such a shifter shifts the first selected kernel intermediate value KIV_SEL_1 bitwise towards a more significant bit position).

The adder 143_2 may generate the kernel intermediate value KIV_OP calculated by adding the first selected kernel intermediate value KIV_SEL_1 to which '0' is added and the second selected kernel intermediate value KIV_SEL_2.

Through an operation of the operator 143 as described above, the operator 143 may perform an operation such as [Equation 4].

Figure 16:
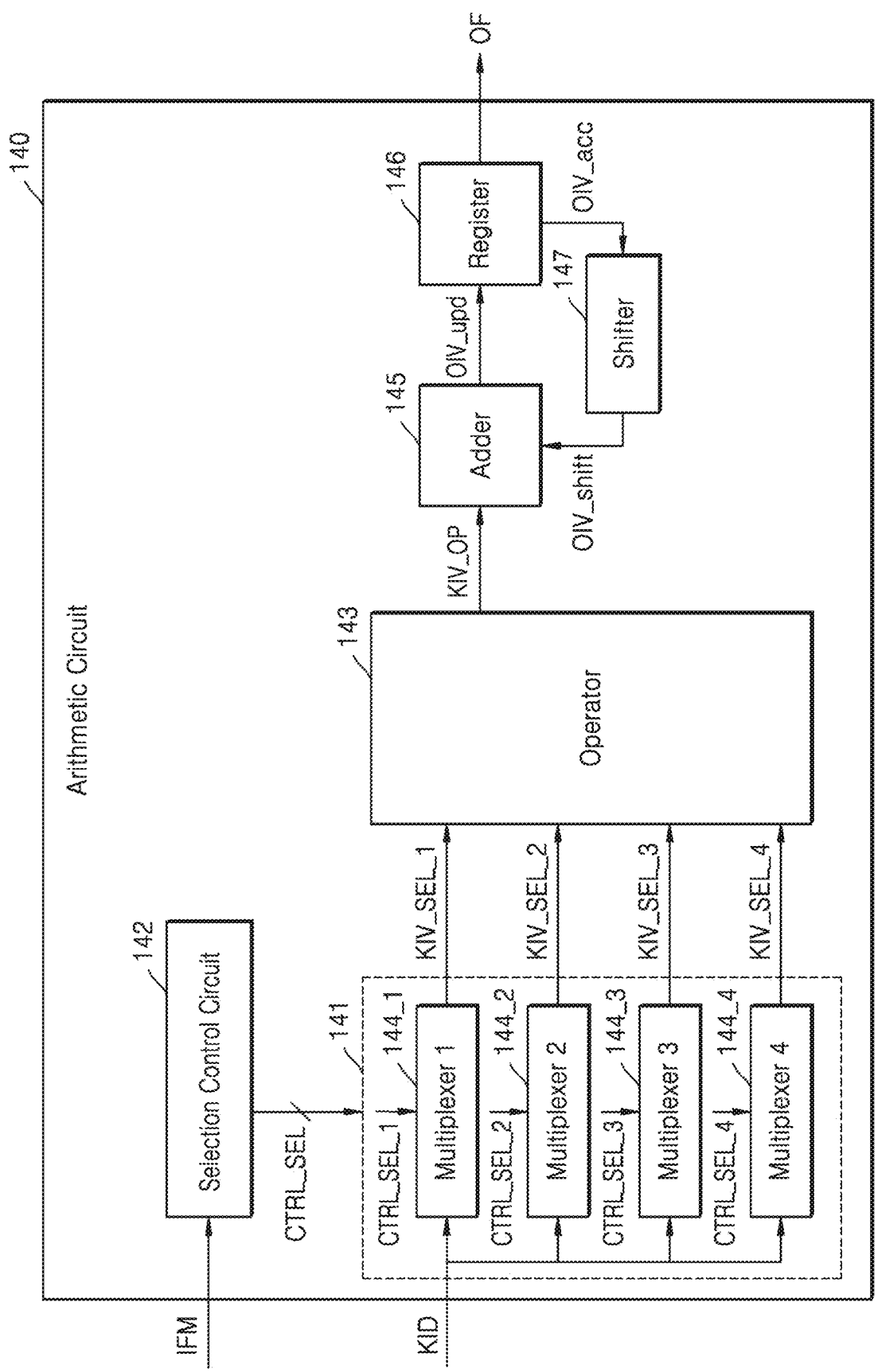
FIG. 16 illustrates an arithmetic circuit according to an embodiment of the inventive concepts.

FIG. 16 illustrates the arithmetic circuit 140 according to an embodiment of the inventive concepts. A description of the arithmetic circuit 140 of FIG. 16 which is redundant with that of FIG. 8 will be omitted, and a difference from FIG. 8 will be mainly described. FIG. 16 shows in particular the arithmetic circuit 140 corresponding to an embodiment where a_1 and a_2 are values represented by 4-bits.

When a_1 and a_2 are represented by 4-bit values, the arithmetic circuit 140 may obtain the first selected kernel intermediate value KIV_SEL_1 through a selection operation corresponding to the most significant bits of a_1 and a_2, obtain the second selected kernel intermediate value KIV_SEL_2 through a selection operation corresponding to the next most significant bits of a_1 and a_2, obtain the third selected kernel intermediate value KIV_SEL_3 through a selection operation corresponding to the next most significant bits of a_1 and a_2, obtain the fourth selected kernel intermediate value KIV_SEL_4 through a selection operation corresponding to the least significant bits of a_1 and a_2, and then obtain the kernel intermediate value KIV_OP calculated through an operation of [Equation 5] as shown below.

$$KIV\_OP=KIV\_SEL\_1*8+KIV\_SEL\_2*4+KIV\_SEL\_3*2+KIV\_SEL\_4 \quad \text{[Equation 5]}$$

For the above operation, the arithmetic circuit 140 may include the multiplexing circuit 141 and/or the operator 143. The multiplexing circuit 141 may include the first multiplexer 144_1, the second multiplexer 144_2, a third multiplexer 144_3, and/or a fourth multiplexer 144_4. According to some example embodiments, operations described herein as being performed by any or all of the multiplexing circuit 141, the operator 143, the first multiplexer 144_1, the second multiplexer 144_2, the third multiplexer 144_3 and the fourth multiplexer 144_4 may be performed by at least one processor (e.g., the processor 160) executing program code that includes instructions corresponding to the operations. The instructions may be stored in a memory of the neural network processor 100 (e.g., the internal memory 120).

The selection control signal CTRL_SEL may include the first selection control signal CTRL_SEL_1 to the fourth selection control signal CTRL_SEL_4. The first multiplexer 144_1 may select at least one kernel intermediate value from among a plurality of kernel intermediate values included in the kernel intermediate data KID based on the first selection control signal CTRL_SEL_1, and provide the first selected kernel intermediate value KIV_SEL_1 to the operator 143. In a similar manner, the second multiplexer 144_2 to the fourth multiplexer 144_4 may each select at least one kernel intermediate value from among the plurality of kernel intermediate values included in the kernel intermediate data KID based on second selection control signal CTRL_SEL_2 to the fourth selection control signal CTRL_SEL_4, respectively, and provide the second selected kernel intermediate value KIV_SEL_2 to the fourth selected kernel intermediate value KIV_SEL_4 to the operator 143.

The operator 143 may generate the kernel intermediate value KIV_OP calculated by performing an operation using the first selected kernel intermediate value KIV_SEL_1 to the fourth selected kernel intermediate value KIV_SEL_4. In an embodiment, the operator 143 may perform an operation such as [Equation 5]. An embodiment of the operator 143 is described with reference to FIG. 17.

Figure 17:
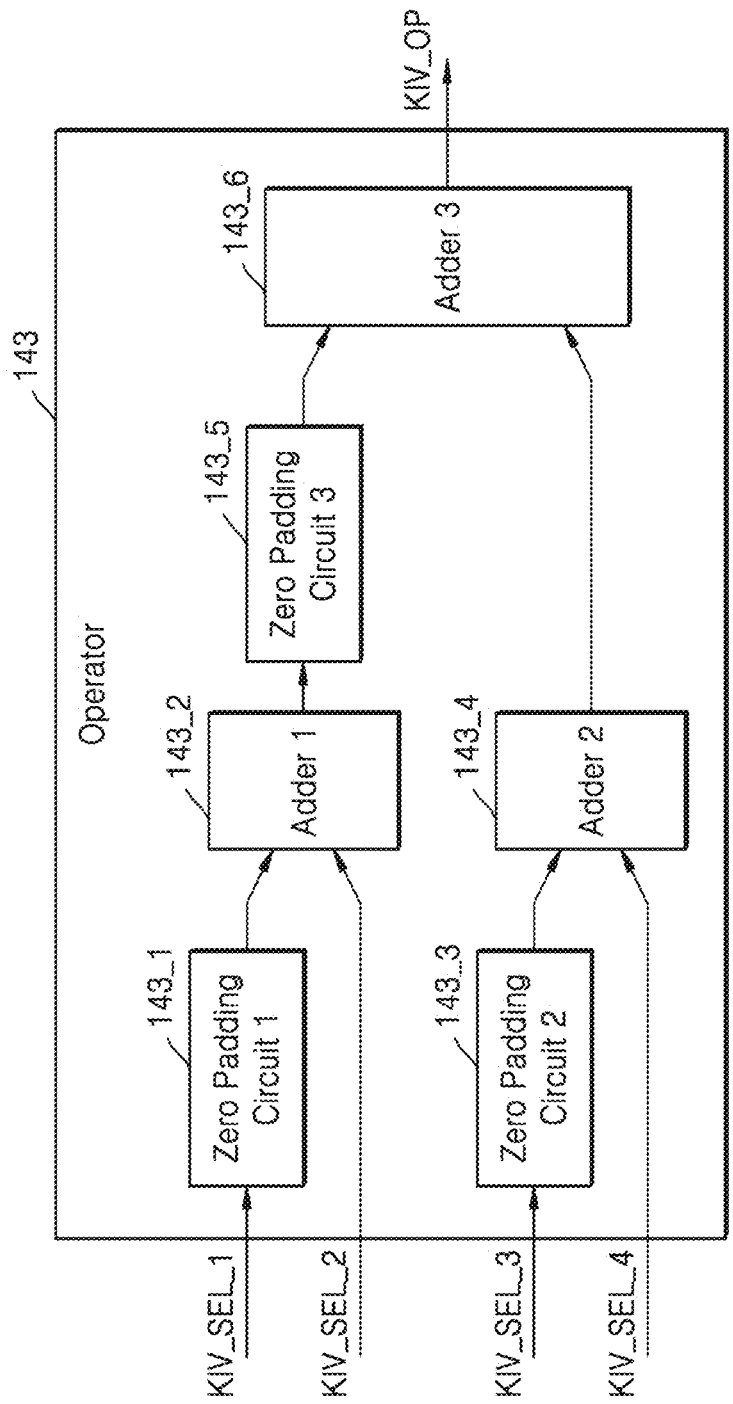
FIG. 17 shows an operator according to an embodiment of the inventive concepts.

FIG. 17 shows the operator 143 according to an embodiment of the inventive concepts. A description of the operator 143 that is redundant with that of FIG. 16 is omitted.

The operator 143 may include the first zero padding circuit 143_1, the first adder 143_2, a second zero padding circuit 143_3, a second adder 143_4, a third zero padding circuit 143_5 and/or a third adder 143_6. According to some example embodiments, operations described herein as being performed by any or all of the first zero padding circuit 143_1, the first adder 143_2, the second zero padding circuit 143_3, the second adder 143_4, the third zero padding circuit 143_5 and the third adder 143_6 may be performed by at least one processor (e.g., the processor 160) executing program code that includes instructions corresponding to the operations. The instructions may be stored in a memory of the neural network processor 100 (e.g., the internal memory 120).

The first zero padding circuit 143_1 may add '0' to the least significant bit of the first selected kernel intermediate value KIV_SEL_1 and provide the first selected kernel intermediate value KIV_SEL_1 to which the '0' is added to the first adder 143_2. In an embodiment, the first zero padding circuit 143_1 may be implemented as a shifter.

The first adder 143_2 may provide a value obtained by adding the first selected kernel intermediate value KIV_SEL_1 to which the '0' is added to the second selected kernel intermediate value KIV_SEL_2 to the third zero padding circuit 143_5.

The second zero padding circuit 143_3 may add '0' to the least significant bit of the third selected kernel intermediate value KIV_SEL_3 and provide the third selected kernel intermediate value KIV_SEL_3 to which the '0' is added to the second adder 143_4. In embodiment, the second zero padding circuit 143_3 may be implemented as a shifter.

The second adder 143_4 may provide a value obtained by adding the third selected kernel intermediate value KIV_SEL_3 to which the '0' is added to the fourth selected kernel intermediate value KIV_SEL_4 to the third adder 143_6.

The third zero padding circuit 143_5 may add '00' to the least significant bit of the value provided from the first adder 143_2 and provide the value to which '00' is added to the third adder 143_6. In an embodiment, the third zero padding circuit 143_5 may be implemented as a shifter.

The third adder 143_6 may output the kernel intermediate value KIV_OP calculated by summing the values provided from the second adder 143_4 and the third zero padding circuit 143_5.

Through the above operation of the operator 143, the operator 143 may perform an operation such as [Equation 5].

Figure 18:
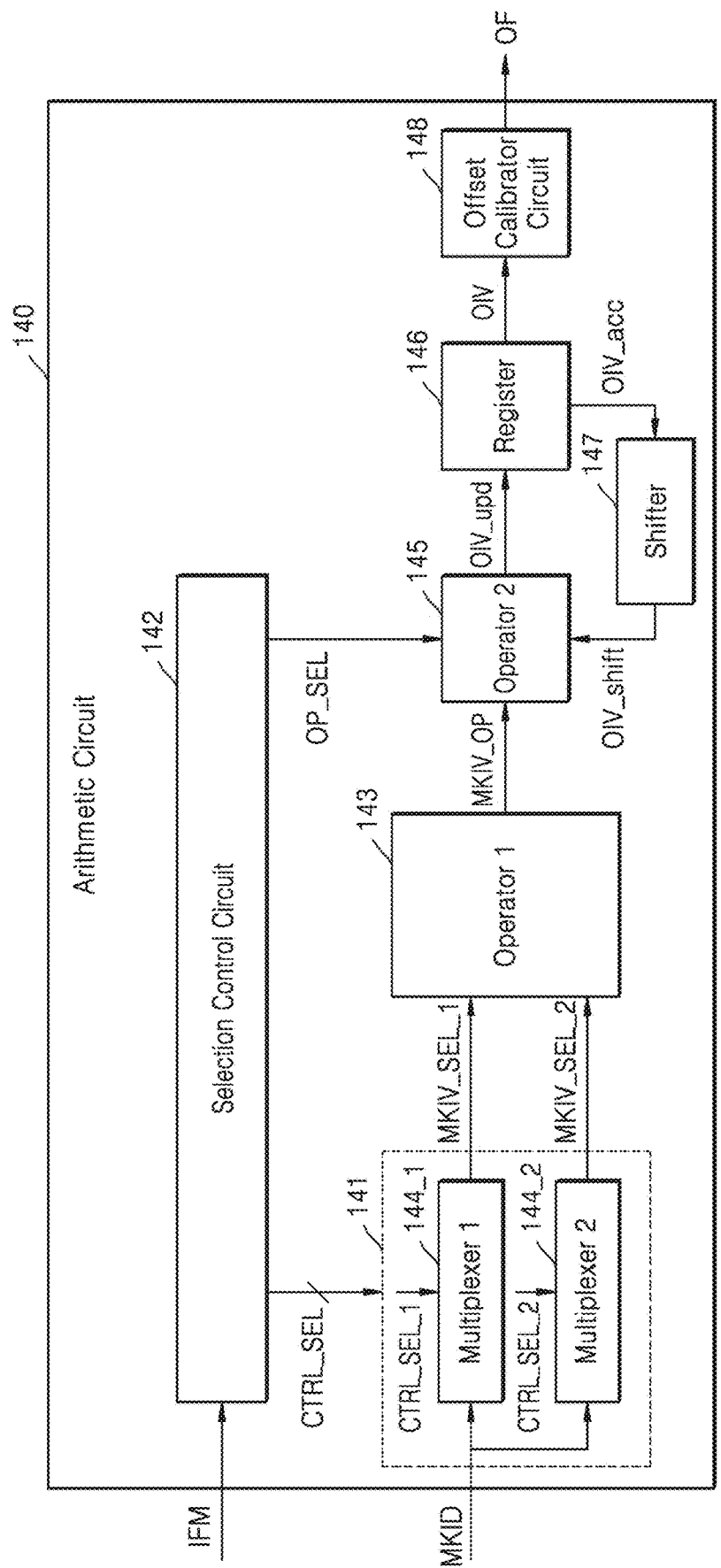
FIG. 18 shows an arithmetic circuit according to an embodiment of the inventive concepts.

FIG. 18 shows the arithmetic circuit 140 according to an embodiment of the inventive concepts. FIG. 18 may in particular show an embodiment in which the arithmetic circuit 140 corresponding to FIG. 12 and the arithmetic circuit 140 corresponding to FIG. 14 are combined.

The arithmetic circuit 140 may include the multiplexing circuit 141, the selection control circuit 142, the first operator 143, the second operator 145, the register 146, the shifter 147 and/or the offset calibration circuit 148. The first operator 143 of FIG. 18 may correspond to the operator 143 of FIG. 14, and the second operator 145 of FIG. 18 may correspond to the operator 145 of FIG. 12.

The first multiplexer 144_1 may select the first selected modification kernel intermediate value MKIV_SEL_1 from among a plurality of modified kernel intermediate values included in the modified kernel intermediate data MKID based on the first selection control signal CTRL_SEL_1. The second multiplexer 144_2 may select the second selected modification kernel intermediate value MKIV_SEL_2 from among the plurality of modified kernel intermediate values based on the second selection control signal CTRL_SEL_2.

The first operator 143 may obtain a modification kernel intermediate value MKIV_OP calculated from the first selected modification kernel intermediate value MKIV_SEL_1 and the second selected modification kernel intermediate value MKIV_SEL_2 by using an operation such as [Equation 4].

The second operator 145 may perform an arithmetic operation on the modification kernel intermediate value MKIV_OP and the shifted output intermediate value OIV_shift. A kind of the arithmetic operation may be determined based on the operation selection signal OP_SEL.

An output intermediate value OIV may be updated by the second operator 145, the register 146 and the shifter 147. The offset calibration circuit 148 may output the output feature OF by summing an offset value and the output intermediate value OIV provided by the register 146.

In addition to the above-described embodiments, various example embodiments such as an embodiment in which the arithmetic circuit 140 corresponding to FIG. 12 and the arithmetic circuit 140 corresponding to FIG. 16 are combined may be also possible.

The various operations of methods described above may be performed by any suitable device capable of performing the operations, such as various hardware and/or software implemented in some form of hardware (e.g., processor).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The inventive concepts have been particularly shown and described with reference to example embodiments thereof. The terminology used herein is for the purpose of describing example embodiments only and is not intended to be limiting of the inventive concepts. Thus, it will be understood that various changes in form and details may be made therein without departing from the spirit and scope of the inventive concepts as defined by the appended claims.

While the inventive concepts have been particularly shown and described with reference to example embodiments thereof, it will be understood that various changes in form and details may be made therein without departing from the spirit and scope of the following claims.

What is claimed is:

1. A neural network processor for performing a neural network operation, the neural network processor comprising:
    a memory storing kernel intermediate data, the kernel intermediate data comprising a plurality of kernel intermediate values calculated based on a plurality of weight values included in kernel data, each of the plurality of kernel intermediate values being a value obtained through a linear combination of the plurality of weight values; and
    at least one processor configured to execute computer-readable instructions to perform a convolution operation by selecting at least one kernel intermediate value among the plurality of kernel intermediate values based on one or more input feature values included in an input feature map.

2. The neural network processor of claim 1, wherein each of a plurality of coefficients used in the linear combination has a value of '0' or '1'.

3. The neural network processor of claim 1, wherein each of a plurality of coefficients used in the linear combination has a value of '−1' or '1'.

4. The neural network processor of claim 3, wherein the plurality of kernel intermediate values comprises 2^(N−1) kernel intermediate values, N being a natural number.

5. The neural network processor of claim 1, wherein the at least one processor is further configured to execute the computer-readable instructions to
    store an output intermediate value,
    shift the output intermediate value by 1-bit to generate a shifted output intermediate value, and
    generate an updated output intermediate value by summing the at least one kernel intermediate value and the shifted output intermediate value in response to determining that a summation operation should be performed.

6. The neural network processor of claim 5, wherein the at least one processor is configured to execute the computer-readable instructions to determine that the summation operation should not be performed based on at least one most significant bit value of the one or more input feature values.

7. The neural network processor of claim 6, wherein the at least one processor is further configured to execute the computer-readable instructions to output the updated output intermediate value based on the at least one kernel intermediate value corresponding to at least one least significant bit value of the one or more input feature values.

8. The neural network processor of claim 1, wherein
    the at least one processor is further configured to execute the computer-readable instructions to
        store an output intermediate value,
        shift the output intermediate value by 1-bit to generate a shifted output intermediate value, and
        generate an updated output intermediate value by performing a determined type of operation on the at least one kernel intermediate value and the shifted output intermediate value.

9. The neural network processor of claim 8, wherein the at least one processor is further configured to execute the computer-readable instructions to compensate for an output value generated by summing an offset value and a final output intermediate value based on the updated output intermediate value.

10. The neural network processor of claim 9, wherein the offset value is equal to a value obtained by dividing a sum of the plurality of weight values by '2'.

11. The neural network processor of claim 1, wherein the at least one processor is further configured to execute the computer-readable instructions to
    select a group of kernel intermediate values from among the plurality of kernel intermediate values based on a plurality of input feature values included in the input feature map, the group of kernel intermediate values including the at least one kernel intermediate value, and
    perform an arithmetic operation using the group of kernel intermediate values.

12. The neural network processor of claim 1, wherein the at least one processor is further configured to execute the computer-readable instructions to generate an information signal based on the convolution operation.

13. A convolution operation method of a neural network processor for performing a neural network operation, the convolution operation method comprising:
    generating, by at least one processor, a plurality of kernel intermediate values by performing an operation using a plurality of weight values included in kernel data, each of the plurality of kernel intermediate values being a value obtained through a linear combination of the plurality of weight values;
    selecting, by at least one processor, at least one kernel intermediate value among the plurality of kernel intermediate values based on one or more input feature values included in an input feature map; and
    generating, by at least one processor, an updated output intermediate value by performing at least one operation using the at least one kernel intermediate value and an output intermediate value.

14. The convolution operation method of claim 13, further comprising:
    outputting, by at least one processor, processor the updated output intermediate value based on the at least one kernel intermediate value corresponding to at least one least significant bit value of the one or more input feature values.

15. The convolution operation method of claim 13, wherein the generating the updated output intermediate value comprises:
   shifting a previous output intermediate value by one or more bits to generate a shifted output intermediate value, and
   summing the shifted output intermediate value and the at least one kernel intermediate value.

16. The convolution operation method of claim 13, further comprising:
   outputting, by at least one processor, an output value generated by summing the updated output intermediate value and an offset value determined based on the plurality of weight values and at least one least significant bit value of the one or more input feature values.

17. The convolution operation method of claim 13, wherein the selecting the at least one kernel intermediate value comprises:
   selecting a group of kernel intermediate values among the plurality of kernel intermediate values based on one or more upper bit values of the one or more input feature values when each of the one or more input features values comprises two or more bits, and
   selecting a final kernel intermediate value based on a least-significant bit value of the one or more input feature values.

18. A neural network processor for performing a neural network operation, the neural network processor comprising:
   a memory storing a plurality of kernel intermediate values calculated based on a plurality of weight values included in kernel data, each of the plurality of kernel intermediate values being a value obtained through a linear combination of the plurality of weight values; and
   at least one processor configured to execute computer-readable instructions to perform a convolution operation based on an input feature map and the plurality of kernel intermediate values by selecting a first kernel intermediate value from among the plurality of kernel intermediate values based on one or more input feature values included in the input feature map.

19. The neural network processor of claim 18, wherein the at least one processor is further configured to execute the computer-readable instructions to
   store an output intermediate value,
   shift the output intermediate value one or more bits to generate a shifted output intermediate value, and
   generate an updated output intermediate value by summing the first kernel intermediate value and the shifted output intermediate value.

20. The neural network processor of claim 18, wherein
   the kernel data comprises N weight values, N being a natural number, and
   each of the plurality of kernel intermediate values generated by an inner product of a first vector formed by the plurality of weight values and a second vector of one or more elements having N columns in which
      each element among the one or more elements is '0' or '1', or
      each element among the one or more elements is '−1' or '1'.

* * * * *